(12) United States Patent
Nanba

(10) Patent No.: US 7,522,350 B2
(45) Date of Patent: Apr. 21, 2009

(54) ZOOM LENS SYSTEM AND IMAGE PICKUP APPARATUS INCLUDING THE SAME

(75) Inventor: Norihiro Nanba, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/969,070

(22) Filed: Jan. 3, 2008

(65) Prior Publication Data

US 2008/0165429 A1     Jul. 10, 2008

(30) Foreign Application Priority Data

Jan. 5, 2007 (JP) ............................. 2007-000541

(51) Int. Cl.
*G02B 15/14* (2006.01)
(52) U.S. Cl. .................. 359/691; 359/680; 359/689
(58) Field of Classification Search ................ 359/689, 359/686, 680–682, 691
See application file for complete search history.

(56) References Cited

U.S. PATENT DOCUMENTS

| | | | |
|---|---|---|---|
| 5,381,268 A | 1/1995 | Sato | |
| 6,498,687 B1 | 12/2002 | Sekita | |
| 6,545,819 B1 | 4/2003 | Nanba | |
| 2003/0058549 A1 | 3/2003 | Hagimori | |
| 2003/0210471 A1 | 11/2003 | Mihara | |

FOREIGN PATENT DOCUMENTS

| | | |
|---|---|---|
| JP | 05-249374 | 9/1993 |
| JP | 2001-66503 | 3/2001 |
| JP | 2001-281545 | 10/2001 |
| JP | 2003-131128 | 5/2003 |
| JP | 2002-55278 | 9/2003 |
| JP | 2004-102211 | 4/2004 |

*Primary Examiner*—Darryl J Collins
(74) *Attorney, Agent, or Firm*—Canon USA, Inc IP Div

(57) ABSTRACT

A zoom lens system includes a first lens unit having a negative optical power and a second lens unit having a positive optical power in order from the object side to the image side. In a zooming operation, the distance between the first lens unit and the second lens unit at the telephoto end is smaller than that at the wide angle end. The first lens unit includes a single negative lens element and a single positive lens element, and materials of the lens elements are adequately set.

9 Claims, 17 Drawing Sheets

ZOOM LENS SYSTEM AND IMAGE PICKUP APPARATUS INCLUDING THE SAME

BACKGROUND OF THE INVENTION

1. Field of the Invention

The present invention relates to zoom lens systems.

2. Description of the Related Art

Image pick up apparatuses (cameras), such as video cameras and digital still cameras, including solid-state image pickup elements require small zoom lenses with a high zoom ratio. This type of camera includes various optical elements, such as a low-pass filter and a color correction filter, between a rearmost portion of a lens and a solid-state image pickup element. Therefore, a zoom lens included in this type of camera is required to have a relatively long back focus.

In addition, a zoom lens included in a camera having a solid-state image pickup element for capturing a color image is required to have a high degree of telecentricity at the image side to avoid color shading. A negative-lead zoom lens is known as a small zoom lens having a long back focus and a high degree of telecentricity at the image side. In the negative-lead zoom lens, a lens unit having a negative refractive power is positioned in front (near the object side).

Japanese Patent Laid-Open Nos. 05-249374 (corresponding US patent: U.S. Pat. No. 5,381,268), 2003-131128, and 2004-102211 (corresponding US patent: US 2003/0210471) discuss a negative-lead zoom lens having a long back focus. The negative-lead zoom lens includes a first lens unit having a negative refractive power and a second lens unit having a positive refractive power in order from the object side to the image side. The negative-lead zoom lens performs zooming by moving both the first and second lens units.

Japanese Patent Laid-Open Nos. 2001-66503 (corresponding US patent: U.S. Pat. No. 6,545,819) and 2001-281545 (corresponding US patent: U.S. Pat. No. 6,498,687) discuss a negative-lead, three-unit zoom lens having a high degree of telecentricity at the image side. The negative-lead, three-unit zoom lens includes a first lens unit having a negative refractive power, a second lens unit having a positive refractive power, and a third lens unit having a positive refractive power in order from the object side to the image side.

Japanese Patent Laid-Open Nos. 2001-66503 and 2001-281545 discuss a small lens system having an achromatic structure in which a first lens unit that is nearest to the image side includes a single negative lens and a single positive lens.

Japanese Patent Laid-Open No. 2002-55278 (corresponding US patent: US 2003/0058549) discusses a three-unit zoom lens having a small number of lenses. The three-unit zoom lens includes a first lens unit in which a lens with a negative refractive power has an aspherical surface on each of the object side and the image side.

The overall size of the negative-lead zoom lens can be effectively reduced by increasing the refractive power of each lens unit. However, if the refractive power of each lens unit is simply increased, aberrations largely vary during zooming, and it becomes difficult to obtain a high optical performance over the entire zooming range. For example, as the field angle and the zoom ratio are increased, aberration variations during zooming are also increased. Therefore, it becomes difficult to obtain high optical performance over the entire zooming range.

Accordingly, to reduce the overall size of the negative-lead zoom lens while increasing the field angle and the zoom ratio, adequate settings of lenses included in the lens units are required. In particular, the lens structure of the first lens unit having a negative refractive power is important to reduce aberration variations during zooming and to obtain a high optical performance in the entire zooming range. If, for example, the lens structure of the first lens unit is not adequate, a chromatic aberration and variation thereof during zooming are increased and it becomes difficult to obtain a high optical performance over the entire zooming range.

SUMMARY OF THE INVENTION

The present invention is directed to a negative-lead zoom lens system having a large field angle and a high zoom ratio.

A zoom lens system according to an aspect of the present invention includes a first lens unit having a negative optical power and a second lens unit having a positive optical power in order from an object side to an image side. In a zooming operation, a distance between the first lens unit and the second lens unit at a telephoto end is smaller than that at a wide angle end. The first lens unit includes a single negative lens element and a single positive lens element. The positive lens element and the negative lens element are made of suitably selected materials and a focal length of the first lens unit is adequately set, so that the following conditions are satisfied:

$$v1p < 18.5$$

$$2.0 < |f1|/fw < 2.8$$

$$1.83 < N1n, \text{ and}$$

$$27 < v1n,$$

wherein $v1p$ is an Abbe number of a material of the positive lens element, $f1$ is a focal length of the first lens unit, $fw$ is a focal length of the entire zoom lens system at the wide angle end, and $N1n$ and $v1n$ are a refractive index and an Abbe number, respectively, of the material of the negative lens element.

A zoom lens system according to another aspect of the present invention includes a first lens unit having a negative optical power and a second lens unit having a positive optical power in order from an object side to an image side. In a zooming operation, a distance between the first lens unit and the second lens unit at a telephoto end is smaller than that at a wide angle end. The first lens unit includes a single negative lens element and a single positive lens element. The positive lens element is made of a suitably selected material and focal lengths of the first lens unit and the positive lens element are adequately set, so that the following conditions are satisfied:

$$v1p < 18.5$$

$$2.0 < |f1|/fw < 2.8, \text{ and}$$

$$1.0 < f1p/|f1| < 2.1,$$

wherein, when $v1p$ is an Abbe number of a material of the positive lens element, $f1$ is a focal length of the first lens unit, $fw$ is a focal length of the entire zoom lens system at the wide angle end, and $f1p$ is a focal length of the positive lens element.

A zoom lens system according to another aspect of the present invention includes a first lens unit having a negative optical power, a second lens unit having a positive optical power, and a third lens unit having a positive optical power in order from an object side to an image side. In a zooming operation, a distance between the first lens unit and the second lens unit at a telephoto end is smaller than that at a wide angle end, and a distance between the second lens unit and the third lens unit at the telephoto end is larger than that at the wide angle end. The first lens unit includes a single negative lens element and a single positive lens element. The positive lens element is made of a suitably selected material, and a focal length of the first lens unit is adequately set, so that the following conditions are satisfied:

$v1p < 18.5$, and $2.0 < |f1|/fw < 2.8$, wherein $v1p$ is an Abbe number of a material of the positive lens element, f1 is a focal length of the first lens unit, and fw is a focal length of the entire zoom lens system at the wide angle end. In addition, the lens surface nearest to the object side in the third lens unit is convex toward the object side.

Further features of the present invention will become apparent from the following description of exemplary embodiments with reference to the attached drawings.

DESCRIPTION OF THE EMBODIMENTS

Zoom lens systems according to embodiments of the present invention and an image pickup apparatus including a zoom lens system will be described below.

Figure 1:
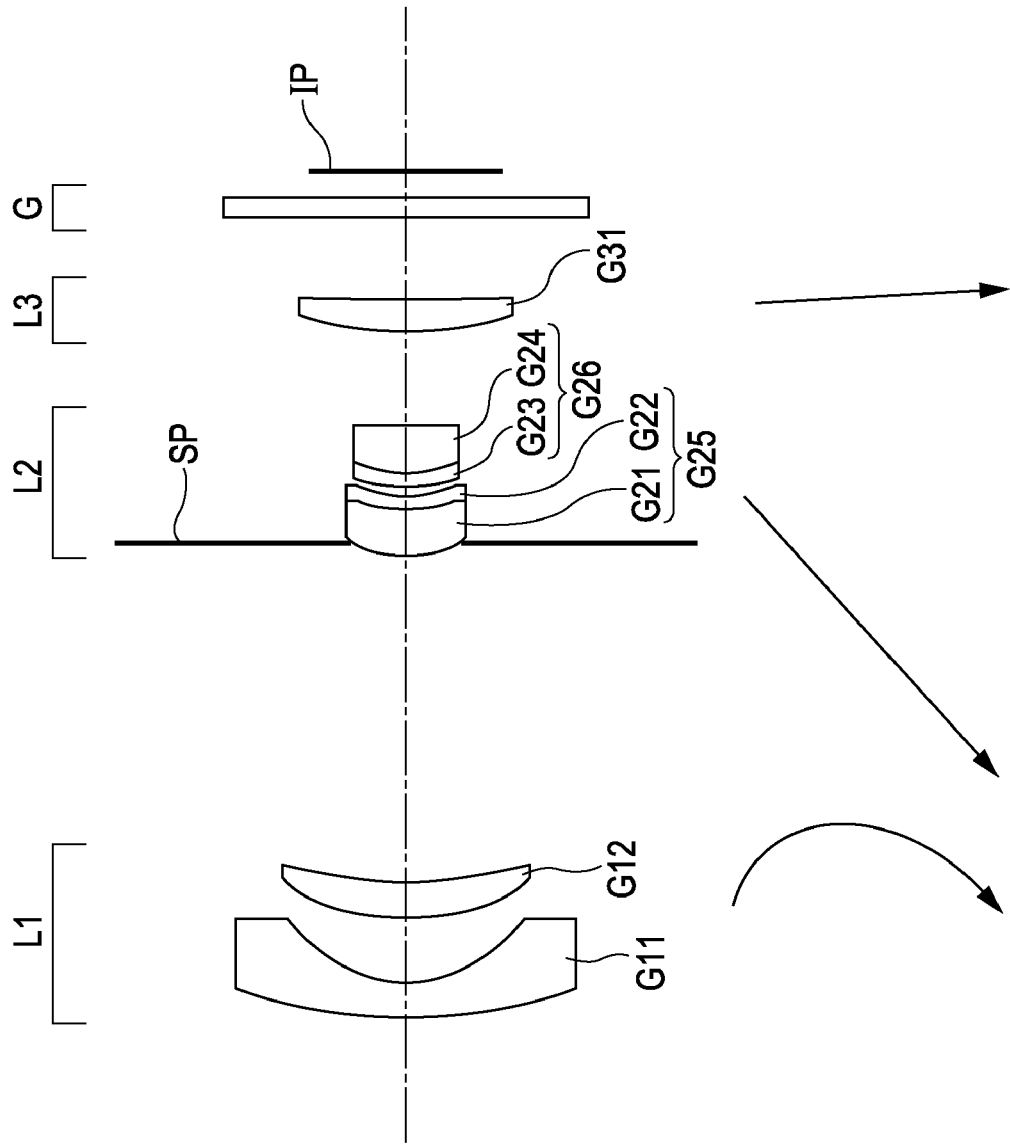
FIG. 1 is an optical sectional view of a zoom lens according to a first embodiment.
Figure 2:
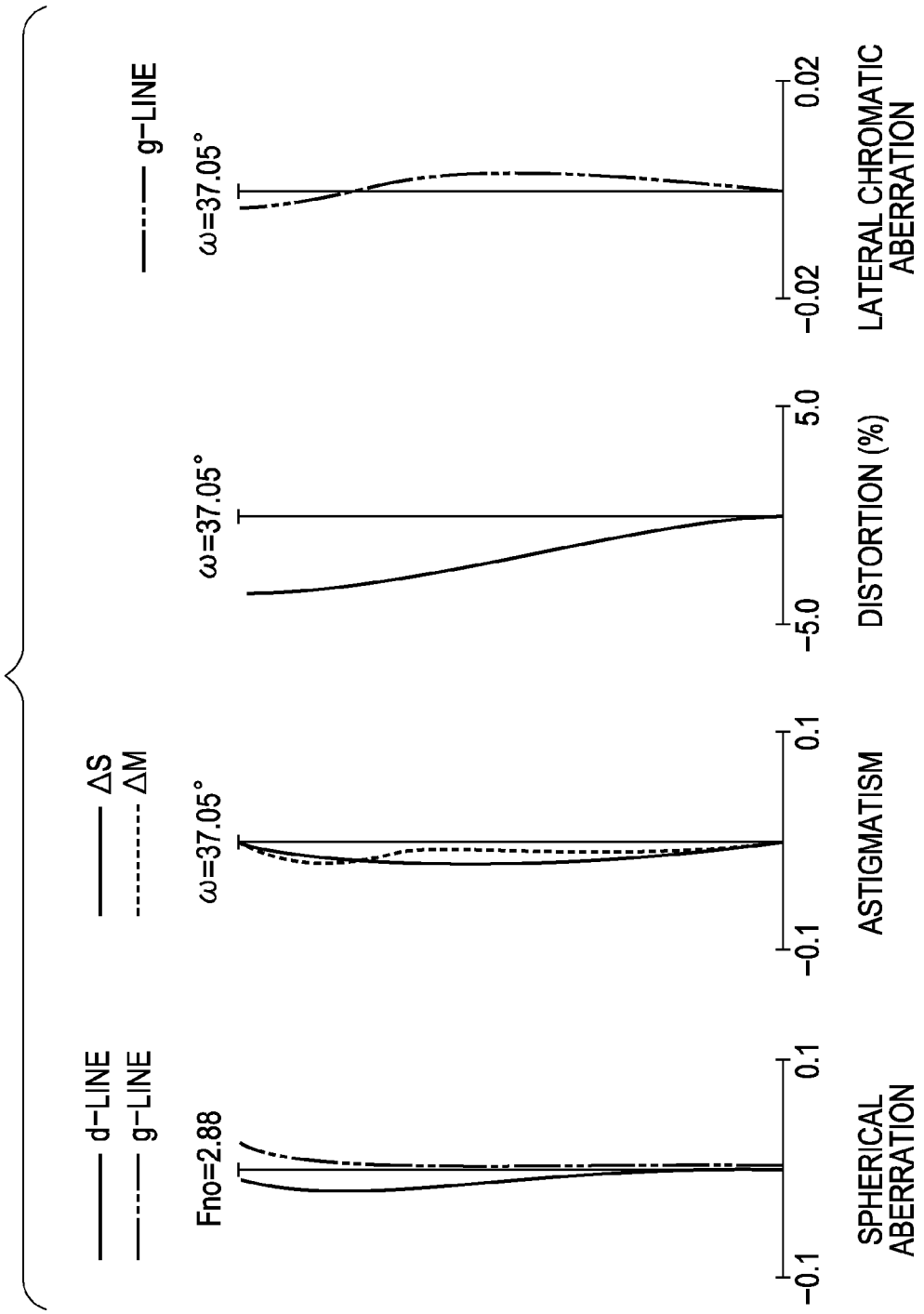
FIG. 2 illustrates aberration diagrams of the zoom lens according to the first embodiment at a wide-angle end.
Figure 3:
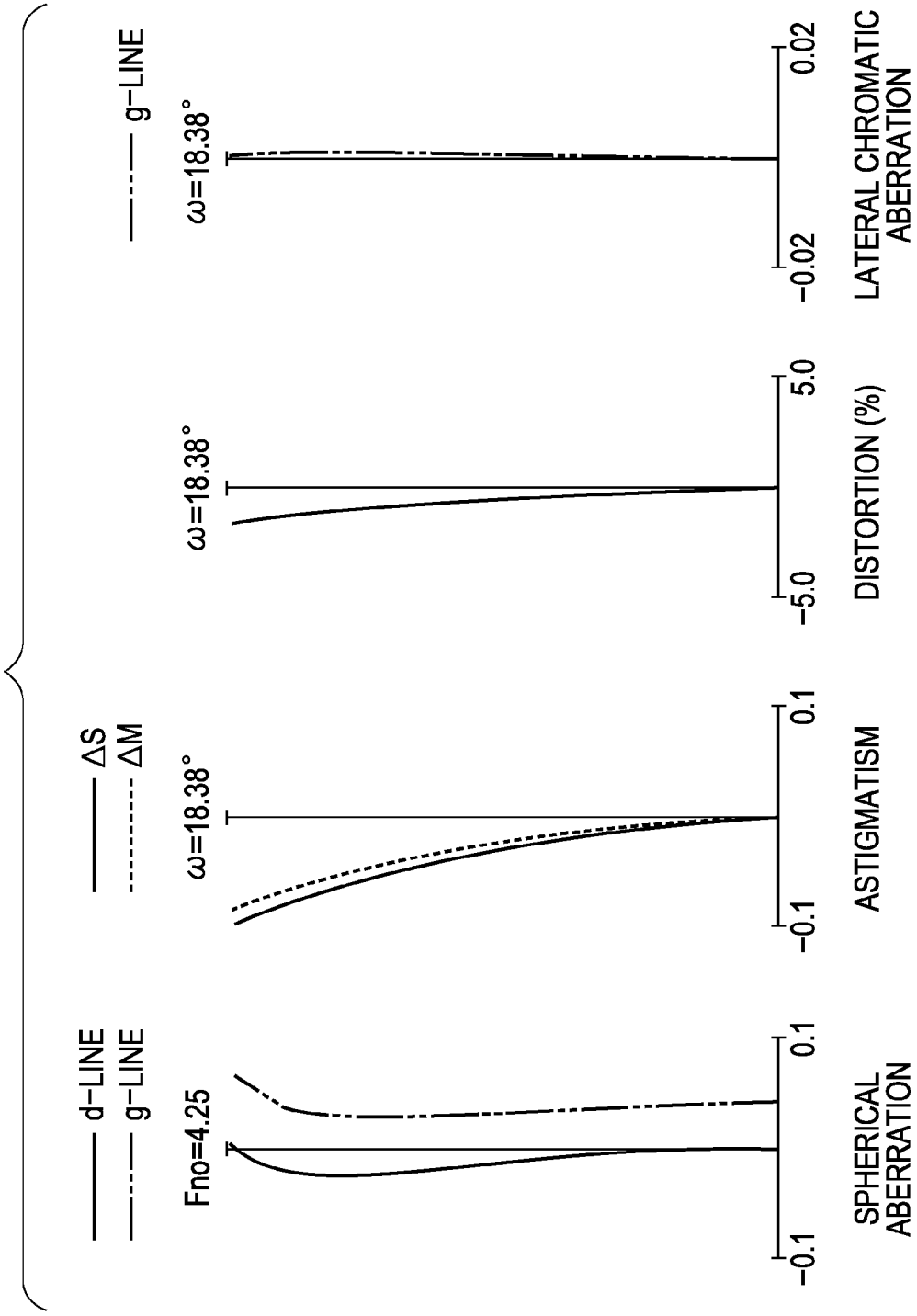
FIG. 3 illustrates aberration diagrams of the zoom lens according to the first embodiment at a middle zoom position.
Figure 4:
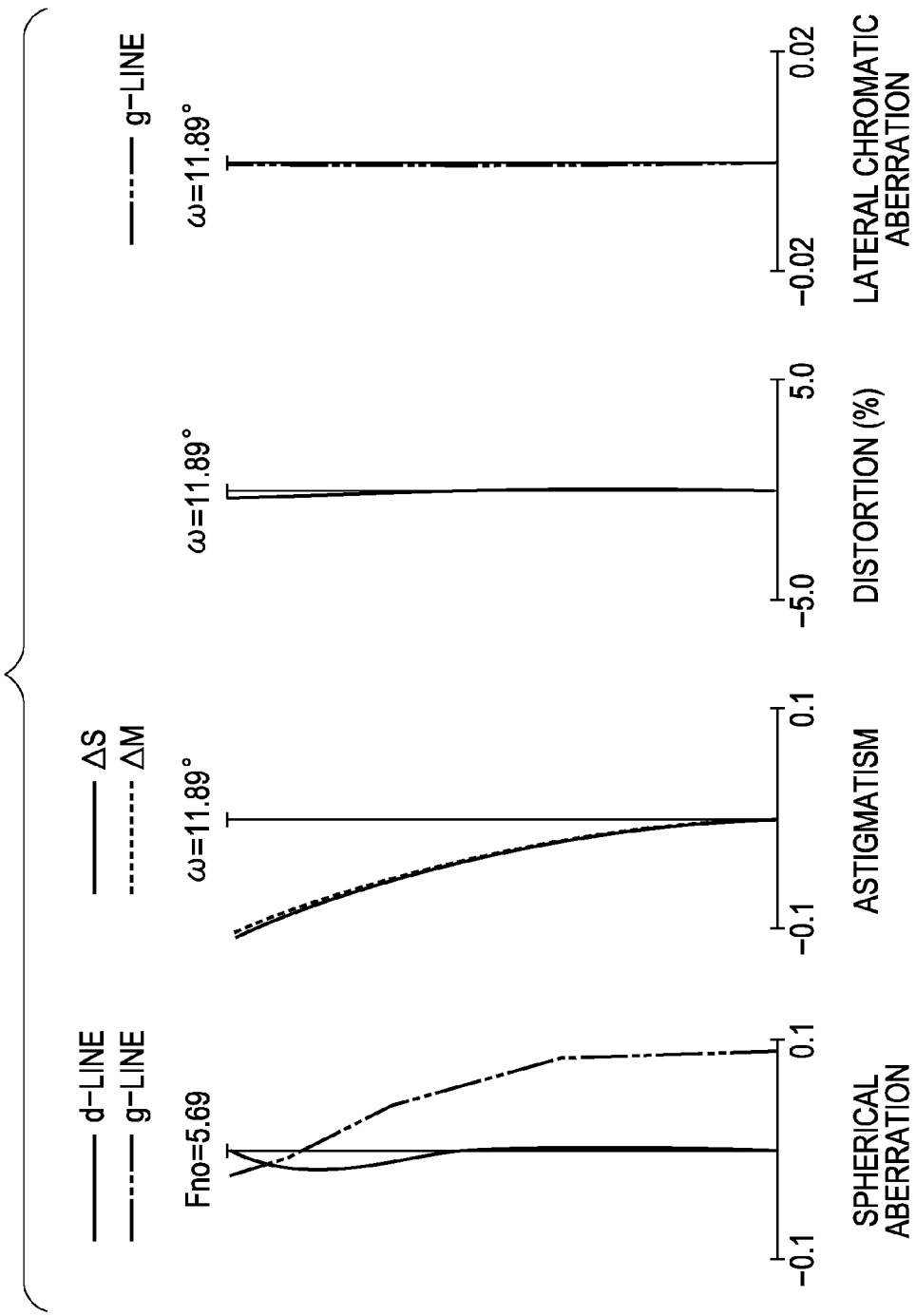
FIG. 4 illustrates aberration diagrams of the zoom lens according to the first embodiment at a telephoto end.

FIG. 1 is a sectional view of a zoom lens according to a first embodiment of the present invention at a wide-angle end (short-focal-length end). FIGS. 2, 3, and 4 are aberration diagrams of the zoom lens according to the first embodiment at the wide-angle end, a middle zoom position, and a telephoto end (long-focal-length end), respectively. The zoom lens according to the first embodiment has a zoom ratio of 3.58 and an opening ratio of about 2.89 to 5.70.

Figure 5:
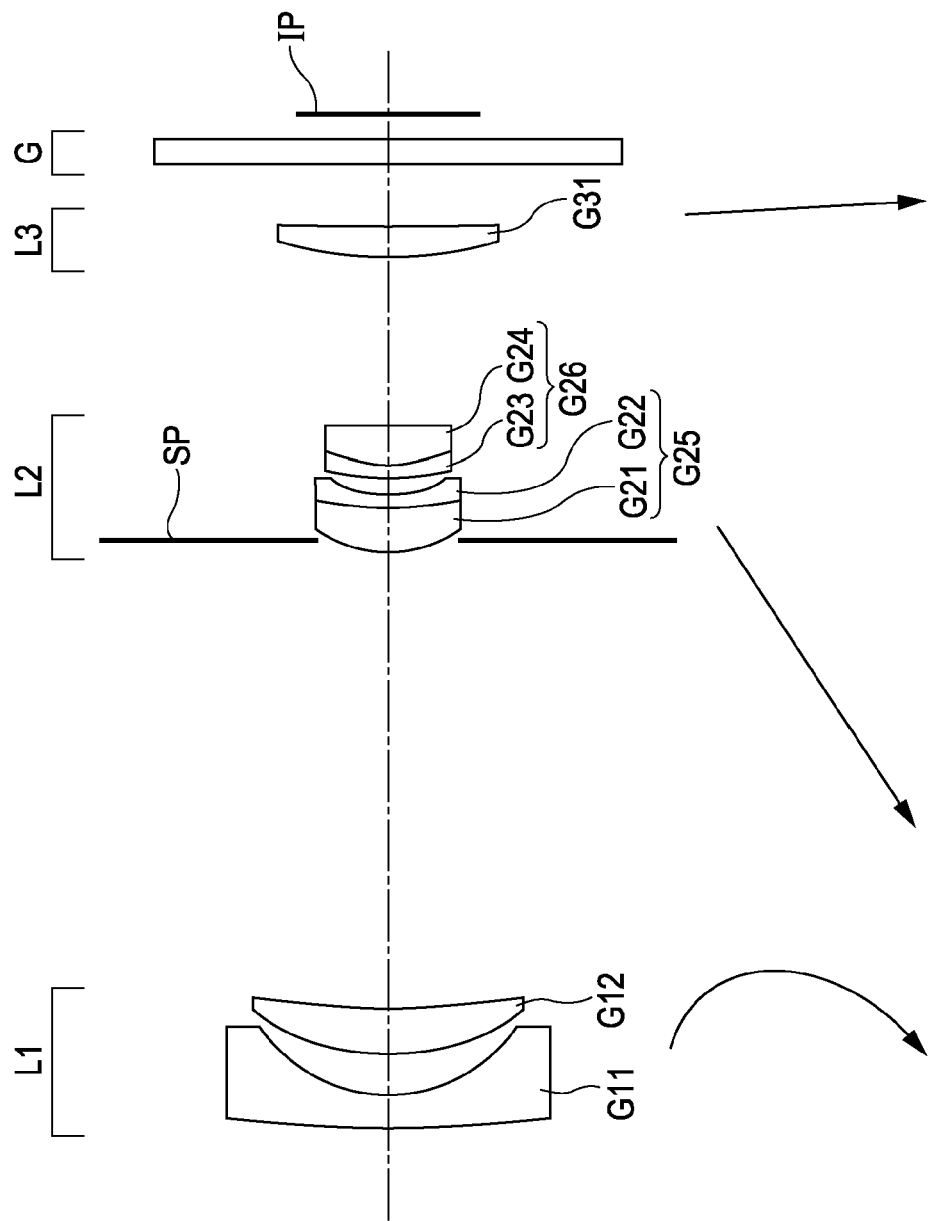
FIG. 5 is an optical sectional view of a zoom lens according to a second embodiment.
Figure 6:
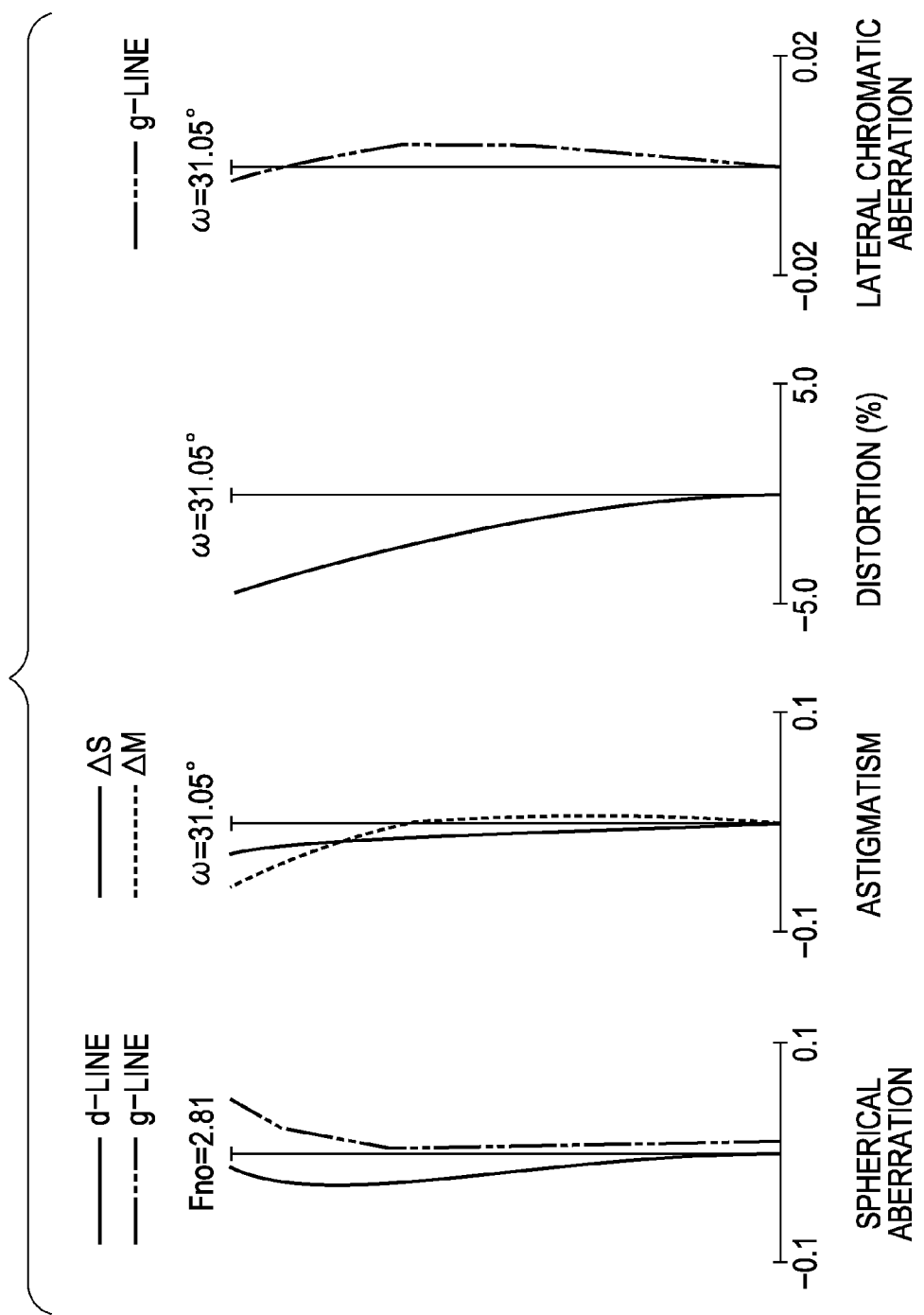
FIG. 6 illustrates aberration diagrams of the zoom lens according to the second embodiment at a wide-angle end.
Figure 7:
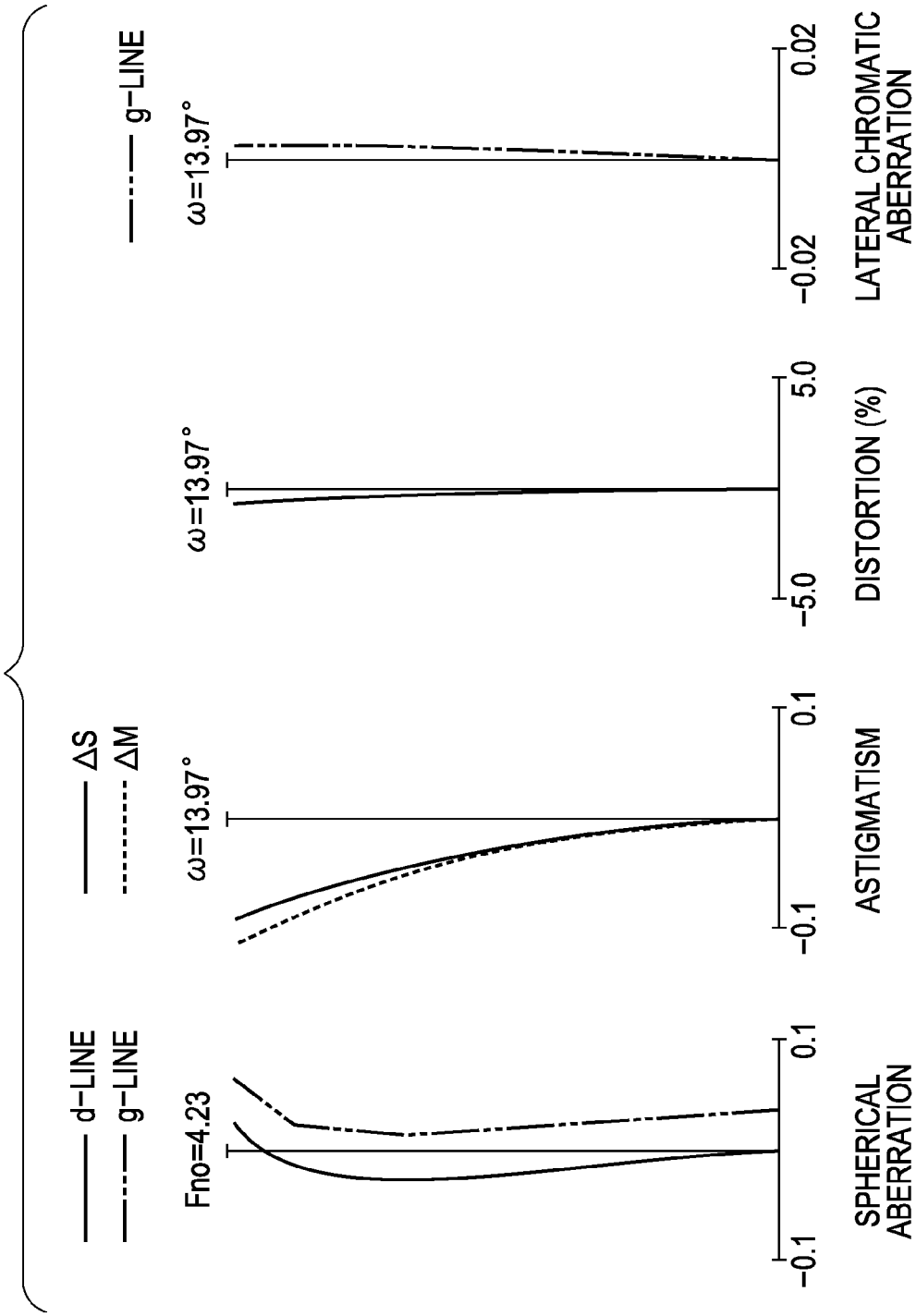
FIG. 7 illustrates aberration diagrams of the zoom lens according to the second embodiment at a middle zoom position.
Figure 8:
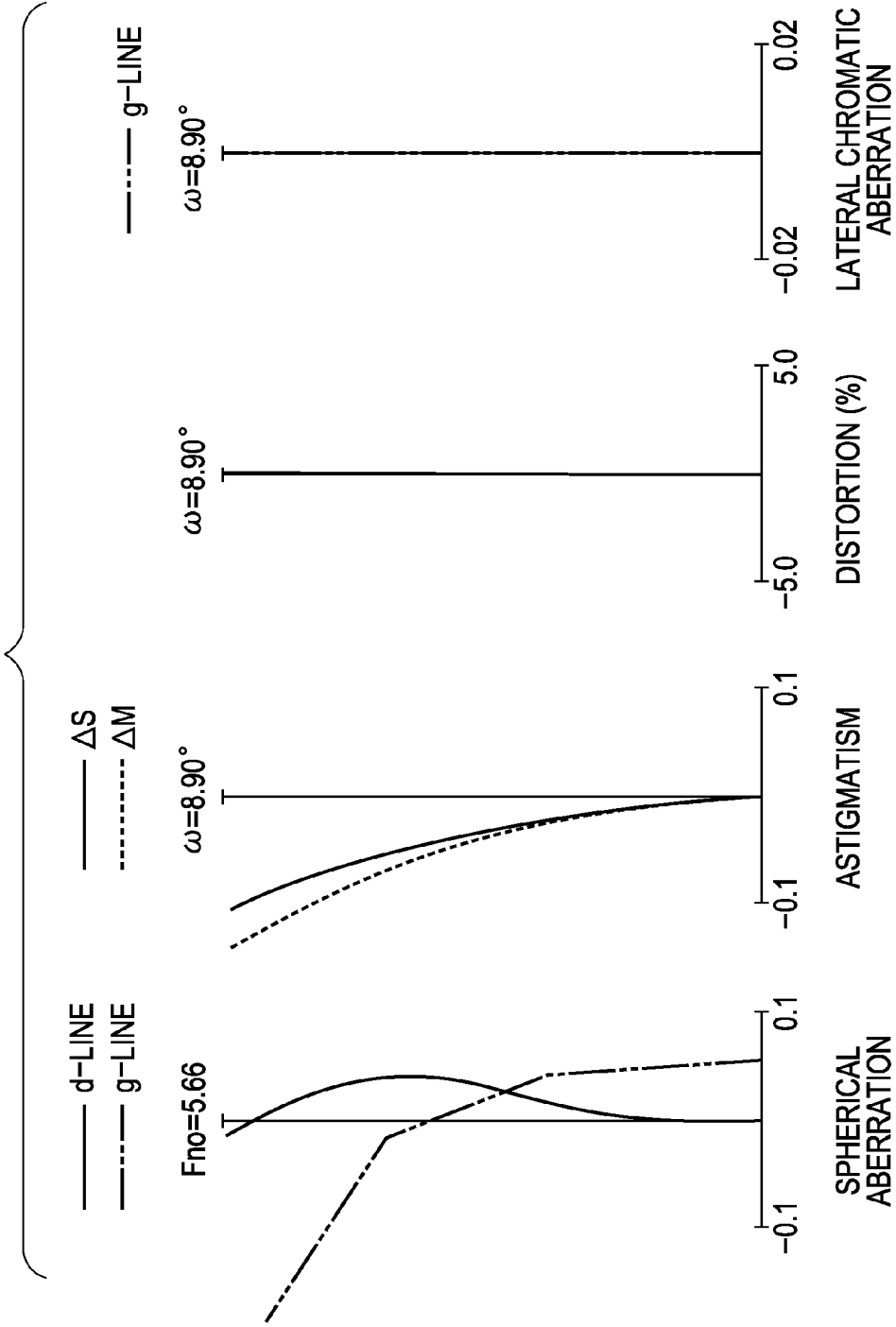
FIG. 8 illustrates aberration diagrams of the zoom lens according to the second embodiment at a telephoto end.

FIG. 5 is a sectional view of a zoom lens according to a second embodiment of the present invention at a wide-angle end. FIGS. 6, 7, and 8 are aberration diagrams of the zoom lens according to the second embodiment at the wide-angle end, a middle zoom position, and a telephoto end, respectively. The zoom lens according to the second embodiment has a zoom ratio of 3.85 and an opening ratio of about 2.82 to 5.67.

Figure 9:
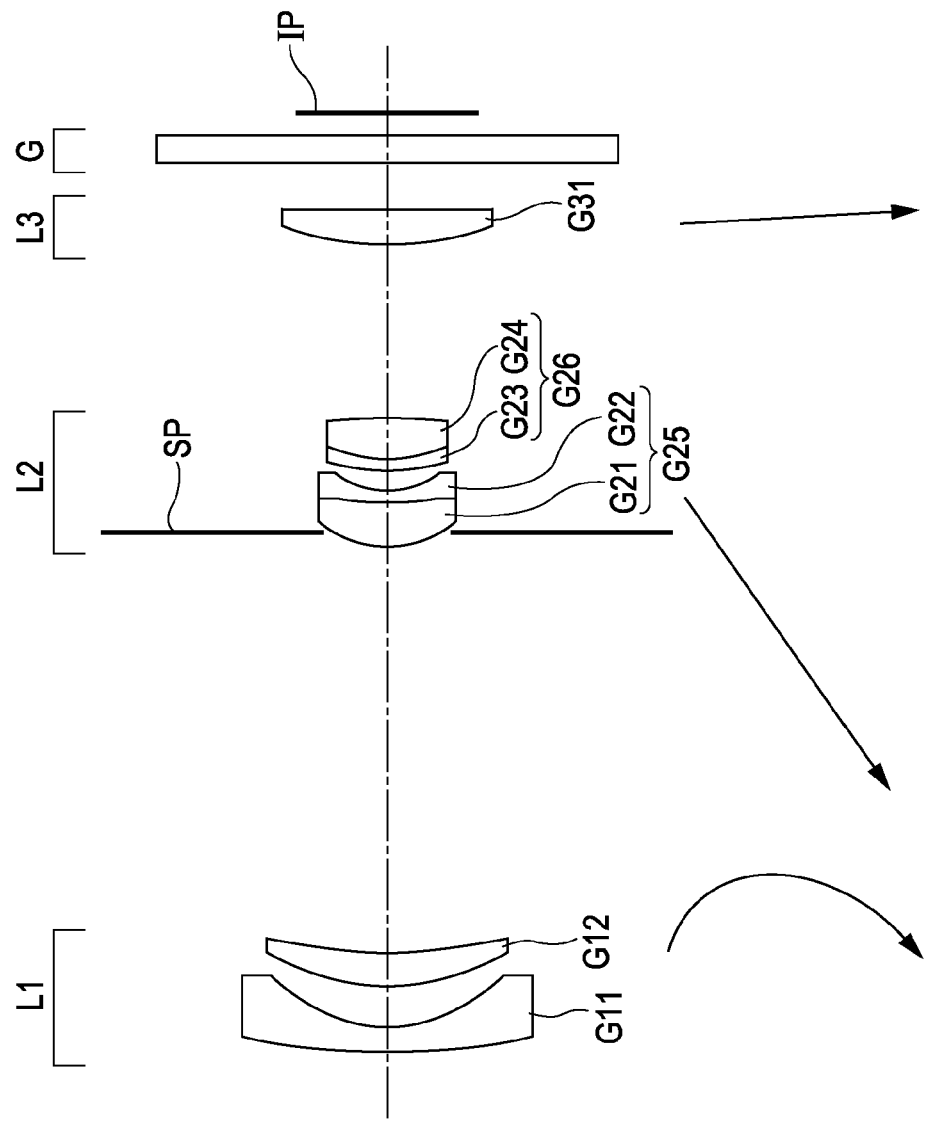
FIG. 9 is an optical sectional view of a zoom lens according to a third embodiment.
Figure 10:
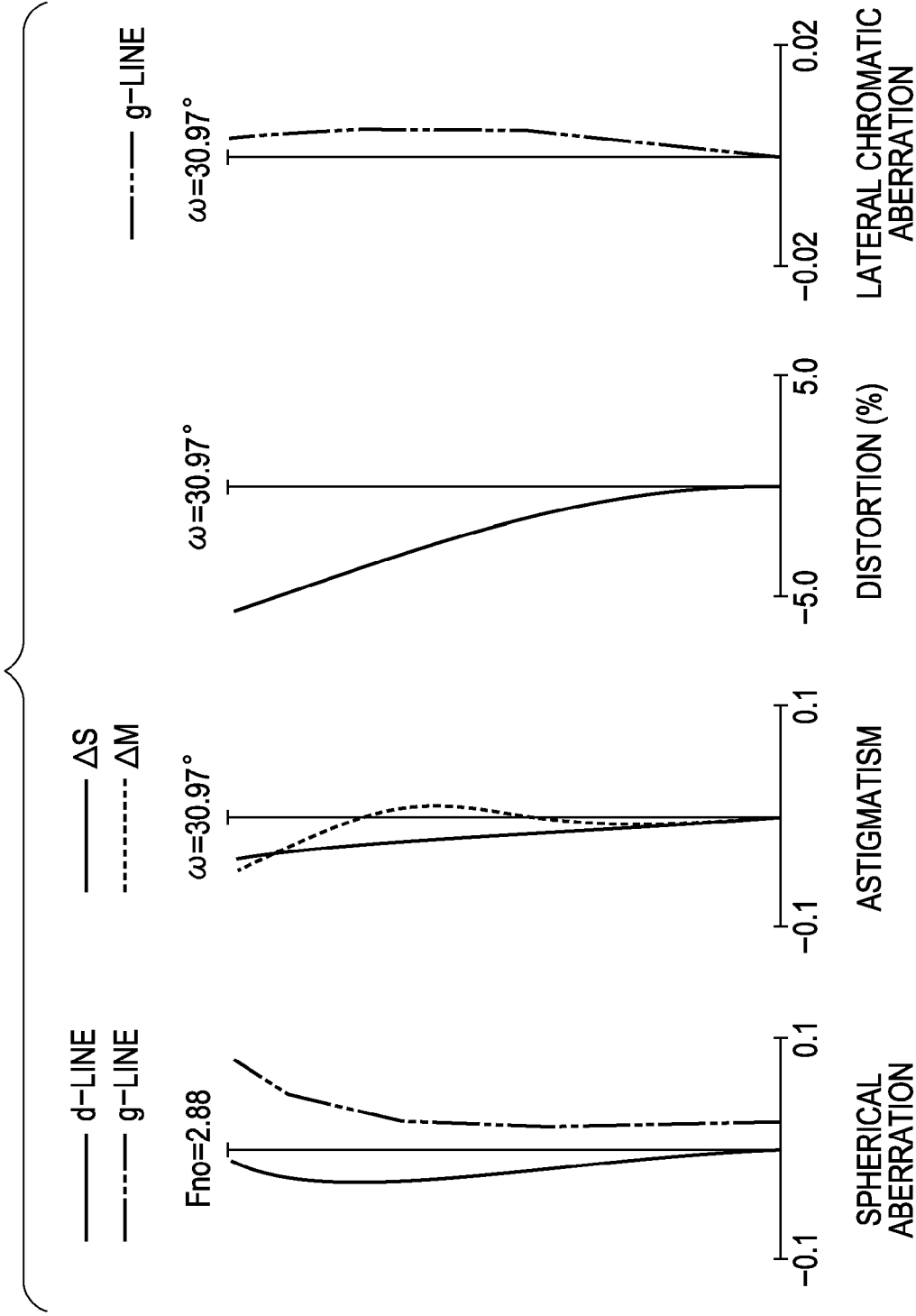
FIG. 10 illustrates aberration diagrams of the zoom lens according to the third embodiment at a wide-angle end.
Figure 11:
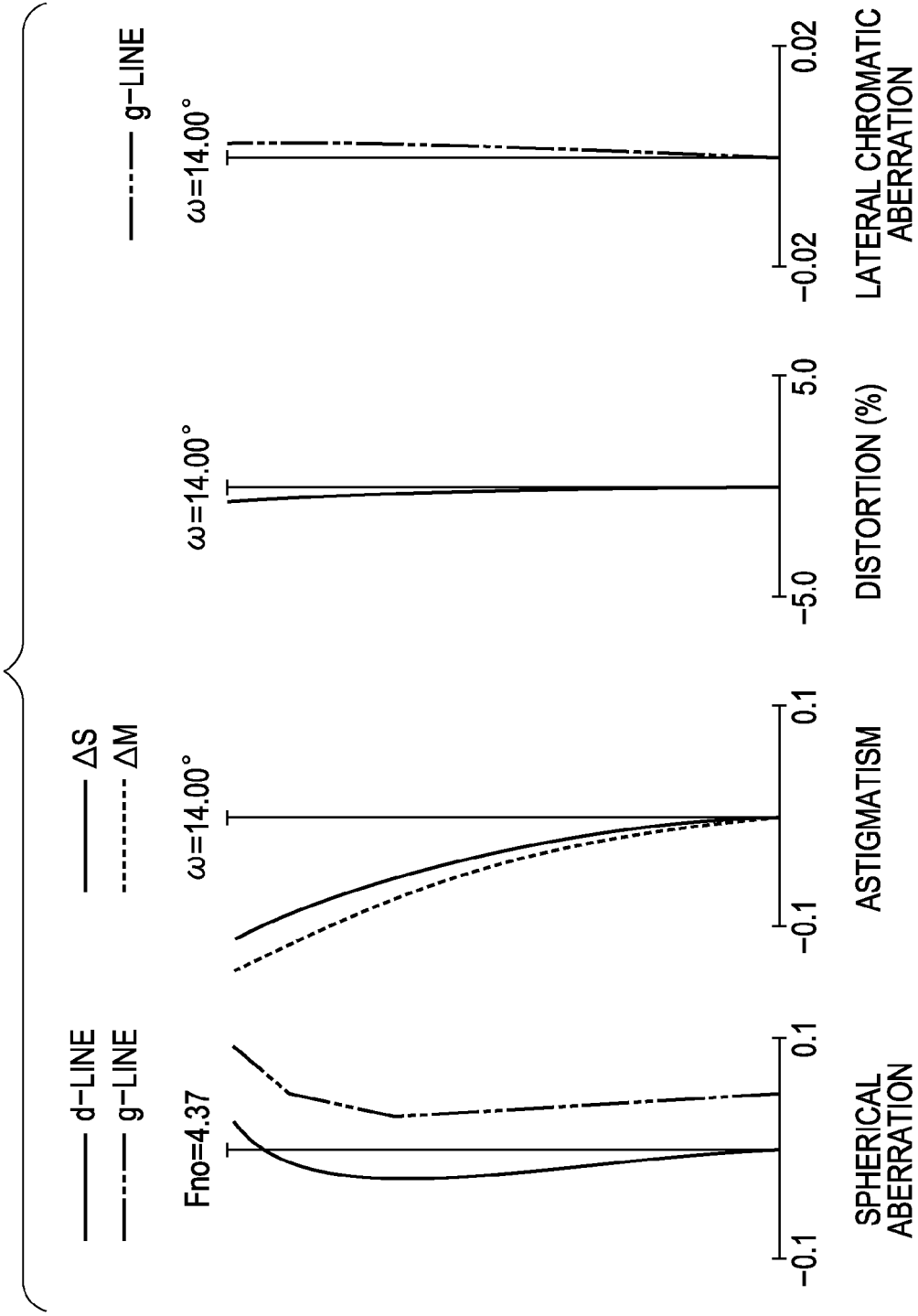
FIG. 11 illustrates aberration diagrams of the zoom lens according to the third embodiment at a middle zoom position.
Figure 12:
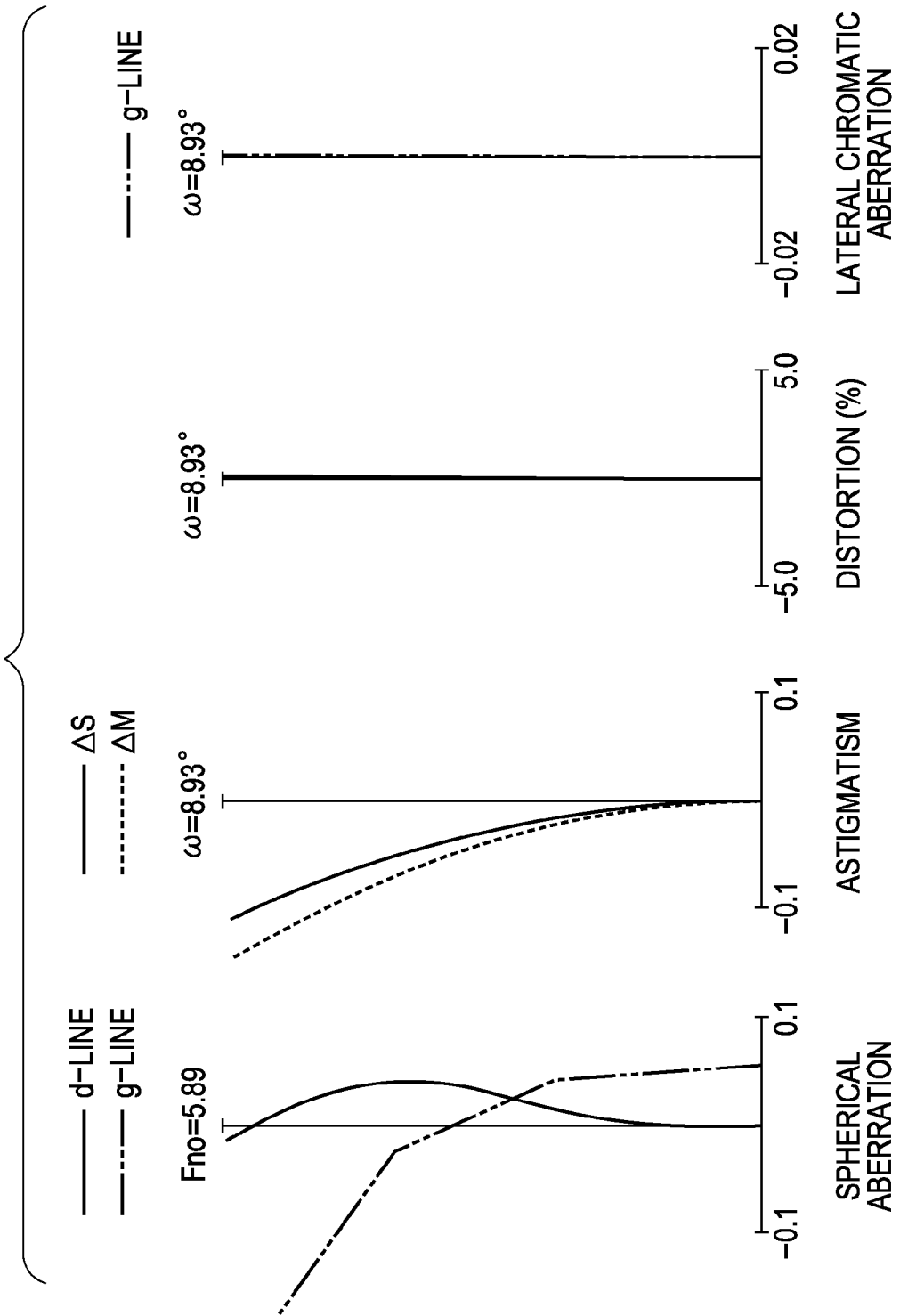
FIG. 12 illustrates aberration diagrams of the zoom lens according to the third embodiment at a telephoto end.

FIG. 9 is a sectional view of a zoom lens according to a third embodiment of the present invention at a wide-angle end. FIGS. 10, 11, and 12 are aberration diagrams of the zoom lens according to the third embodiment at the wide-angle end, a middle zoom position, and a telephoto end, respectively. The zoom lens according to third embodiment has a zoom ratio of 3.82 and an opening ratio of about 2.88 to 5.90.

Figure 13:
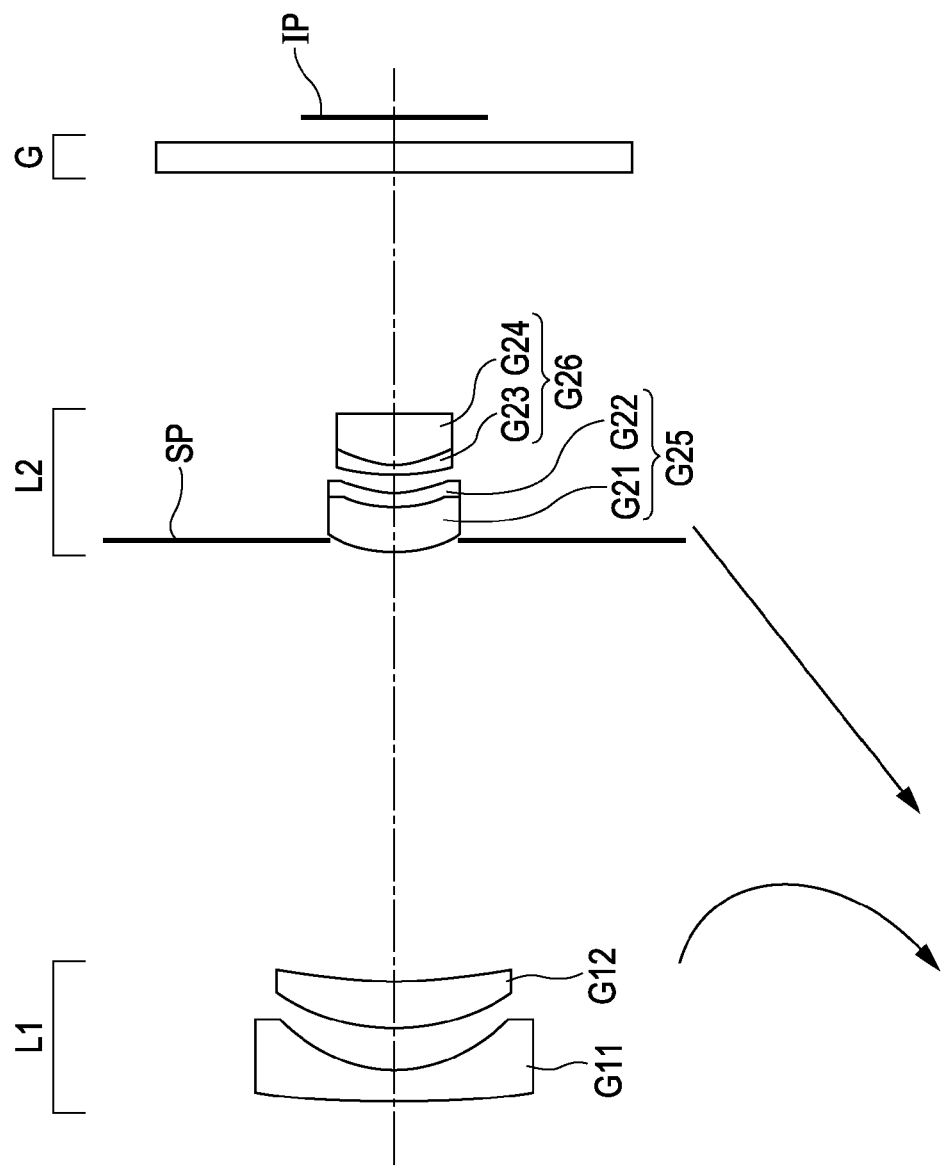
FIG. 13 is an optical sectional view of a zoom lens according to a fourth embodiment.
Figure 14:
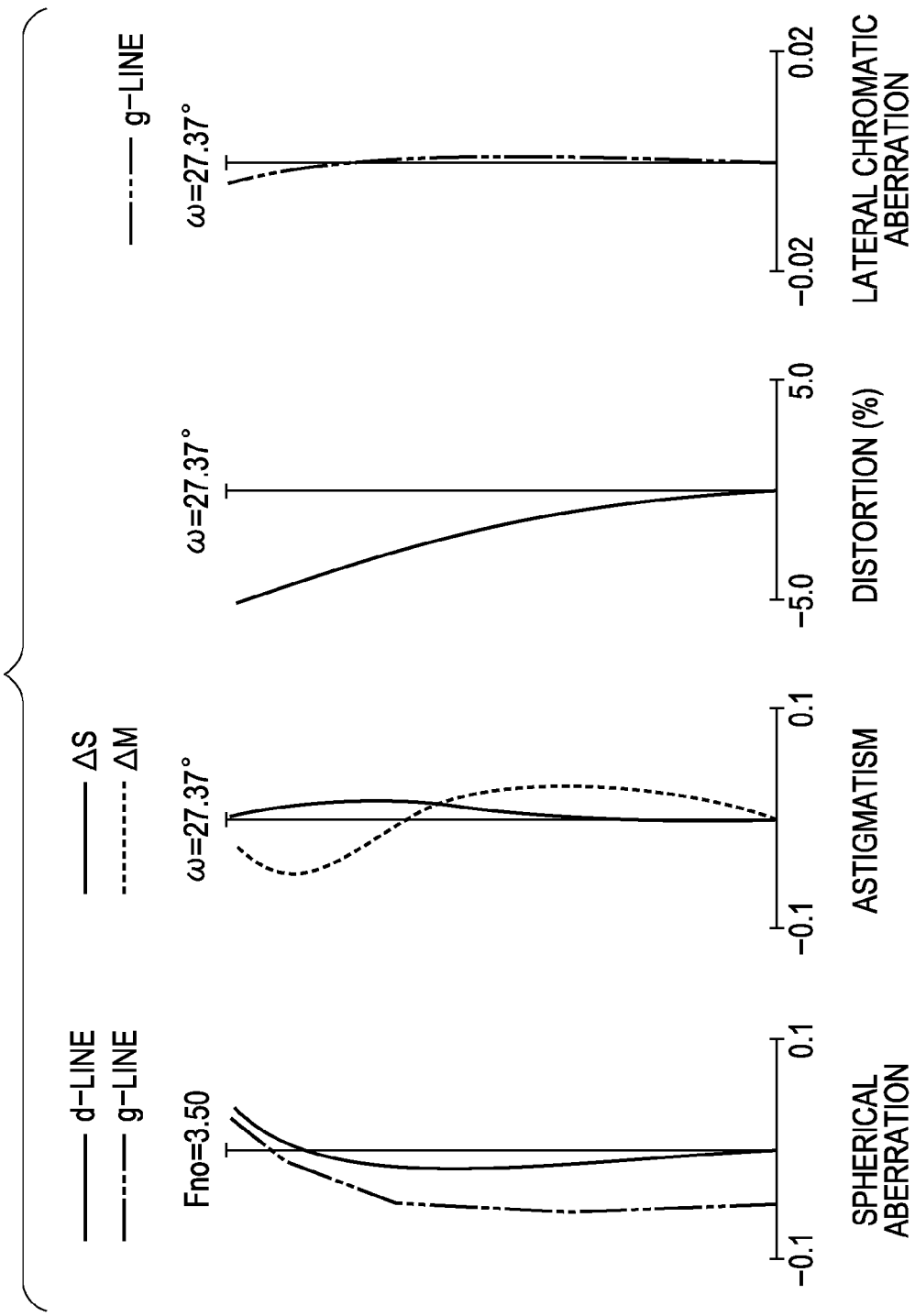
FIG. 14 illustrates aberration diagrams of the zoom lens according to the fourth embodiment at a wide-angle end.
Figure 15:
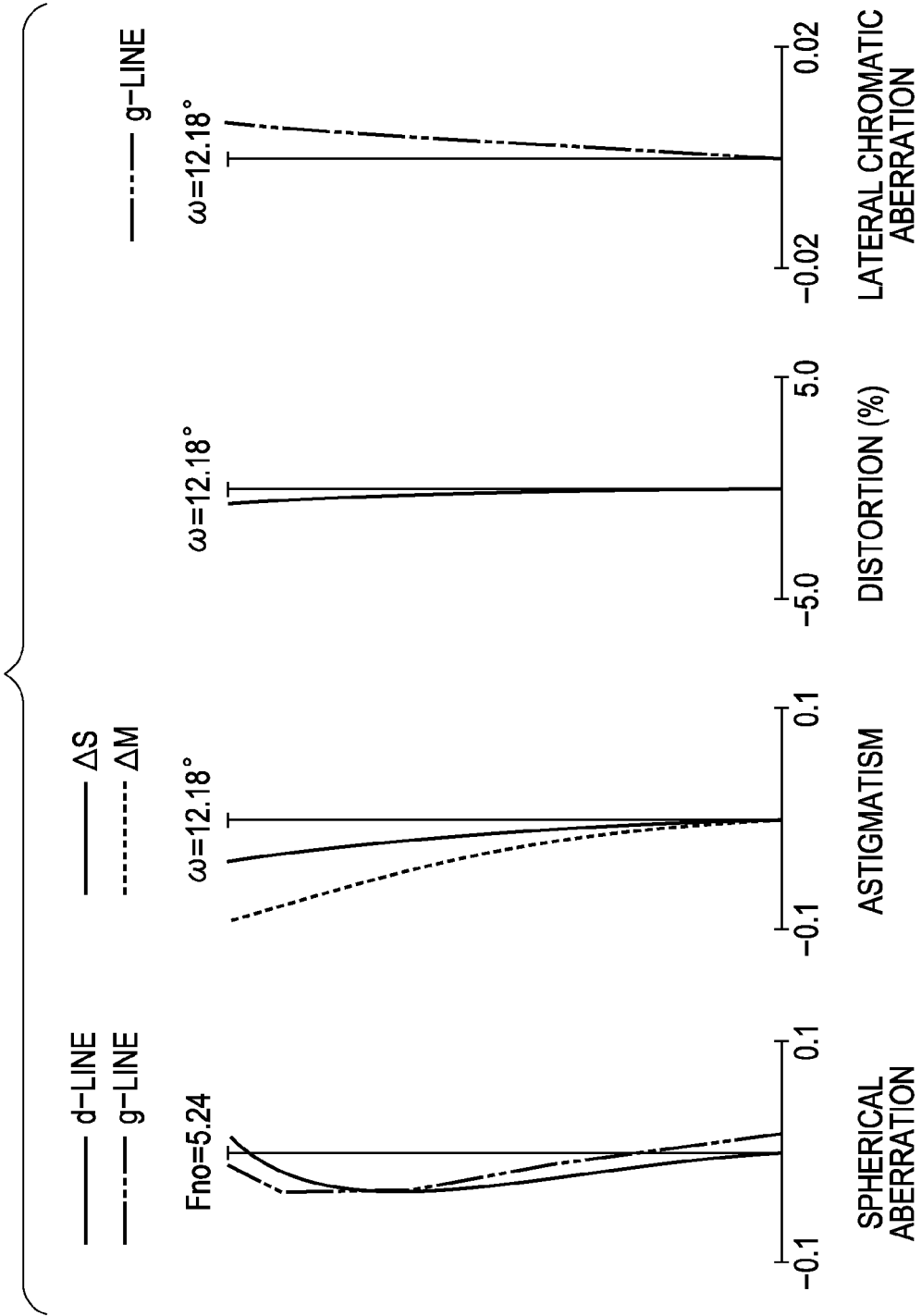
FIG. 15 illustrates aberration diagrams of the zoom lens according to the fourth embodiment at a middle zoom position.
Figure 16:
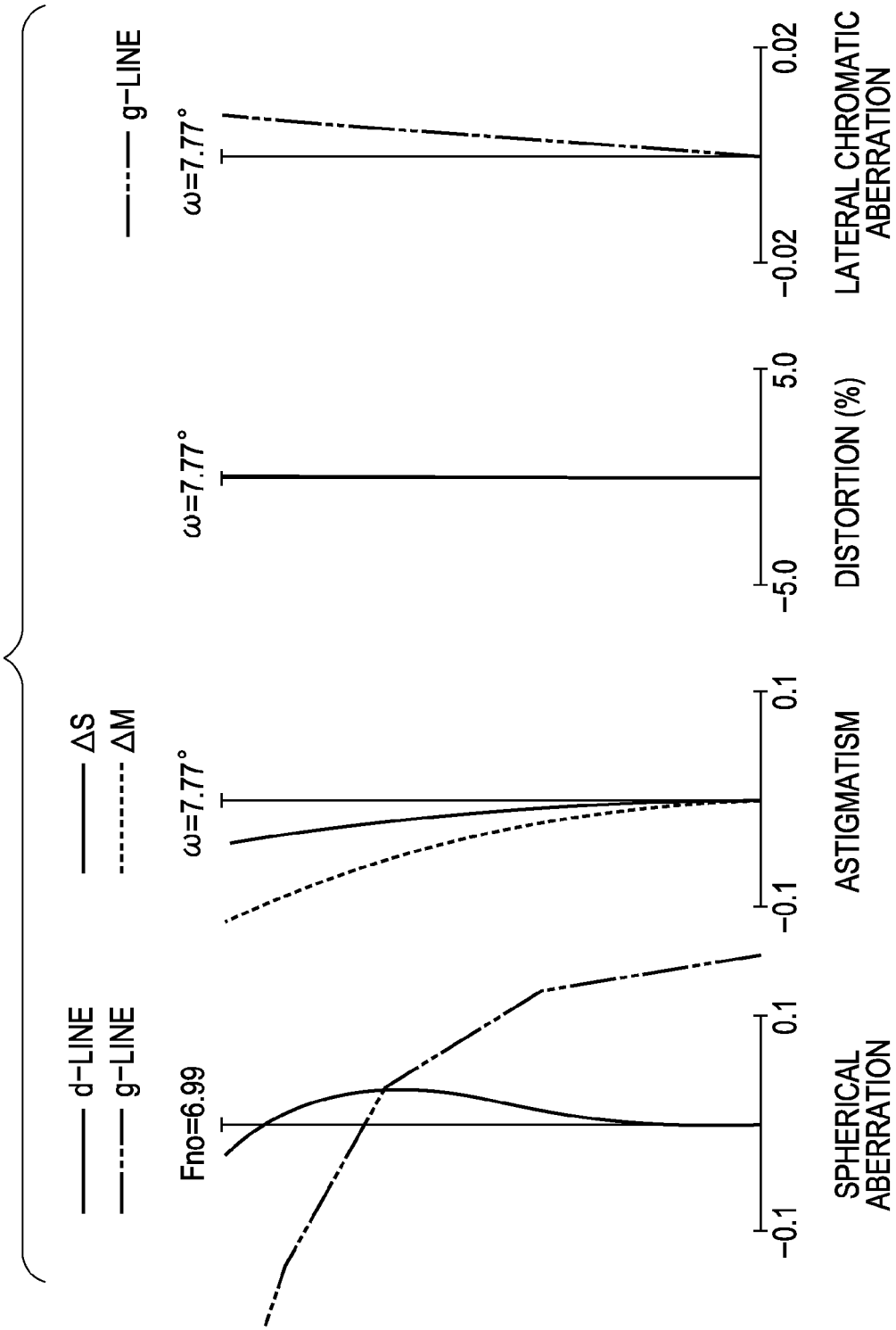
FIG. 16 illustrates aberration diagrams of the zoom lens according to the fourth embodiment at a telephoto end.

FIG. 13 is a sectional view of a zoom lens according to a fourth embodiment of the present invention at a wide-angle end. FIGS. 14, 15, and 16 are aberration diagrams of the zoom lens according to the fourth embodiment at the wide-angle end, a middle zoom position, and a telephoto end, respectively. The zoom lens according to the fourth embodiment has a zoom ratio of 3.80 and an opening ratio of about 3.50 to 7.00.

Figure 17:
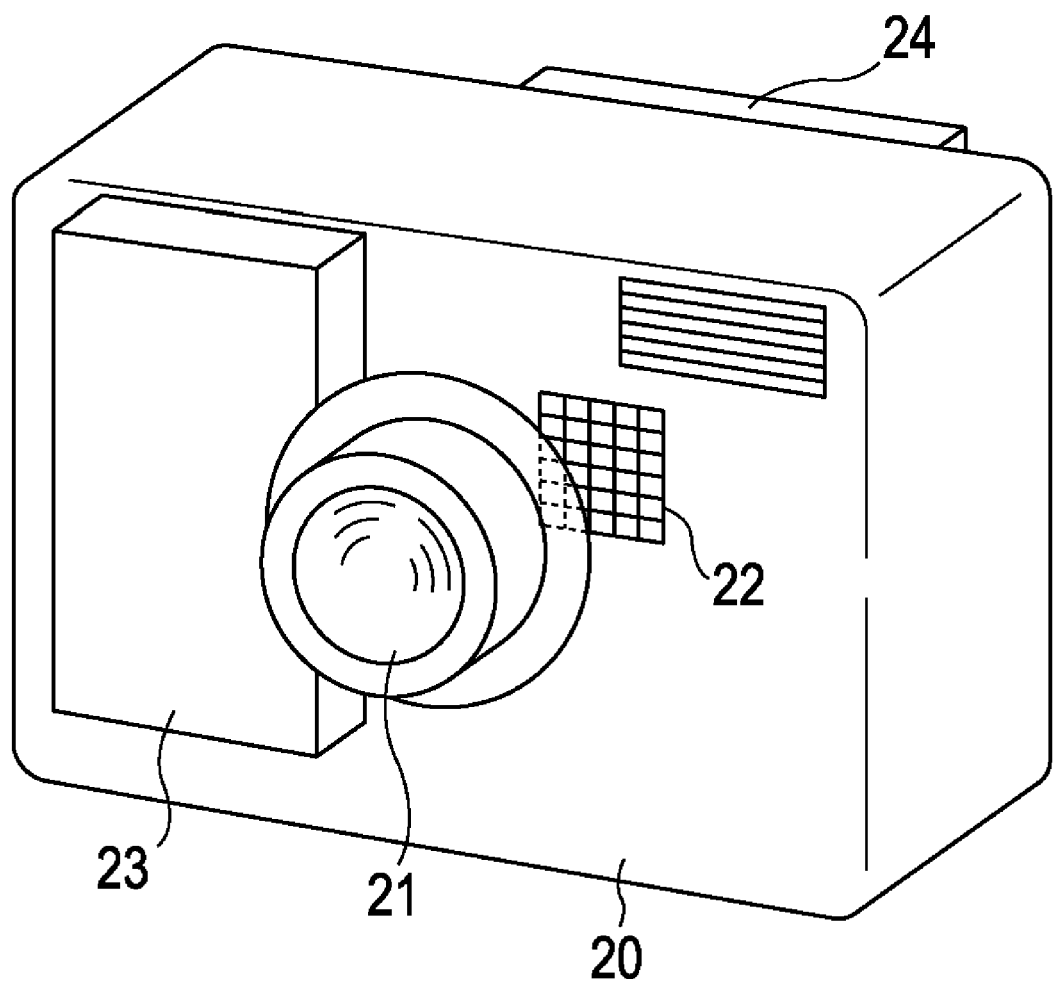
FIG. 17 is a schematic diagram illustrating an image pickup apparatus according to the present invention.

FIG. 17 is a schematic diagram illustrating a digital still camera including a zoom lens system according to the present invention.

The zoom lenses according to the embodiments can be used as imaging lenses in image pickup apparatuses such as a video camera, a silver-halide film camera, and a digital still camera. In the sectional views, the left side shows the object side (front) and the right side shows the image side (rear).

First, characteristics of the zoom lenses according to the first to third embodiments will be described.

Referring to the sectional views of the zoom lenses shown in FIGS. 1, 5, and 9, each zoom lens includes a first lens unit L1 having a negative refractive power (optical power=reciprocal of focal length), a second lens unit L2 having a positive refractive power, and a third lens unit L3 having a positive refractive power.

The first lens unit L1 includes a negative lens G11 and a positive lens G12 in order from the object side to the image side. The second lens unit L2 includes a positive lens G21, a negative lens G22, a negative lens G23, and a positive lens G24 in order from the object side to the image side. The positive lens G21 and the negative lens G22 constitute a single cemented lens G25, and the negative lens G23 and the positive lens G24 constitute another cemented lens G26. Thus, the second lens unit L2 includes two cemented lenses. The third lens unit L3 includes a positive lens G31.

An F-number determining member (hereinafter referred to also as "aperture stop") SP functions as an aperture stop that determines (limits) open-F-number (Fno) light flux.

An optical block G corresponds to an optical filter, a faceplate, a crystal low-pass filter, an infrared cut filter, etc. IP denotes an image plane. In the case in which the zoom lens system is used as a photographing optical system of a video camera or a digital still camera, an image pickup plane of a solid-state image pickup element (photoelectric conversion element), such as a CCD sensor and a CMOS sensor, is placed on the image plane IP. In the case in which the zoom lens system is used as a photographing optical system of a silver-halide film camera, a photosensitive surface corresponding to a film surface is placed on the image plane IP.

In the aberration diagrams, d and g denote d-line and g-line, respectively, and ΔM and ΔS denote a meridional image plane and a sagittal image plane, respectively. The lateral chromatic aberration is shown by g-line.

In each embodiment, the wide-angle end and the telephoto end are zoom positions corresponding to the states in which the magnification-varying lens unit (second lens unit L2) is at one and other ends of a mechanically moveable range along an optical axis.

In the zoom lens according to each embodiment, during zooming from the wide-angle end to the telephoto end, the first lens unit L1 reciprocates along a locus that is convex toward the image side. In addition, the second lens unit L2 moves toward the object side and the third lens unit L3 moves toward the image side.

In the zooming operation, the distance between the first lens unit L1 and the second lens unit L2 at the telephoto end is smaller than that at the wide angle end, and the distance between the second lens unit L2 and the third lens unit L3 at the telephoto end is larger than that at the wide angle end.

In the zoom lenses according to the first to third embodiments, zooming is performed mainly by moving the second lens unit L2. Displacement of the image point during zooming is compensated for by the reciprocal movement of the first lens unit L1.

The F-number determining member SP is positioned between a vertex of an object-side surface of the lens G21 that is nearest to the object side in the second lens unit L2 and an intersecting point of the object-side surface of the lens G21 and a peripheral portion (edge portion) thereof.

Thus, the F-number determining member SP is disposed in the second lens unit L2 and is moved together with the second lens unit L2 during zooming, so that the distance between the entrance pupil and the first lens unit in the wide-angle range L1 is reduced.

Since the F-number determining member SP corresponding to the aperture stop is disposed as described above, the distance between the first lens unit L1 and the second lens unit L2 can be reduced at the telephoto end. Therefore, the amount of movement of the second lens unit L2 toward the object side during zooming can be increased. Accordingly, the zoom ratio can be increased without increasing the overall length at the telephoto end.

To allow the adjustment of the amount of light, a unit for inserting and retracting an aperture stop unit capable of finely adjusting the aperture or an ND filter can be provided on the image side of the second lens unit L2.

Next, the zoom lens according to the fourth embodiment shown in FIG. 13 will be described. In FIG. 13, components similar to those shown in FIGS. 1, 5, and 9 are denoted by the same reference numerals. The fourth embodiment differs from the first to third embodiments in that the third lens unit L3 is not used and only two lens units are provided. Other structures of the fourth embodiment are similar to those of the first to third embodiments.

As shown in FIG. 13, the zoom lens according to the fourth embodiment includes two lens units, which are a first lens unit L1 having a negative refractive power and a second lens unit L2 having a positive refractive power arranged in that order from the object side to the image side.

The first lens unit L1 includes a negative lens G11 and a positive lens G12 in order from the object side to the image side. The second lens unit L2 includes a positive lens G21, a negative lens G22, a negative lens G23, and a positive lens G24 in order from the object side to the image side. The positive lens G21 and the negative lens G22 constitute a cemented lens G25, and the negative lens G23 and the positive lens G24 constitute a cemented lens G26.

During zooming from the wide-angle end to the telephoto end, the first lens unit L1 moves along a locus that is convex toward the image side and the second lens unit L2 moves toward the object side. Accordingly, in the zooming operation, the distance between the first lens unit L1 and the second lens unit L2 at the telephoto end is smaller than that at the wide angle end. Also, in the zoom lens according to the fourth embodiment, zooming is performed mainly by moving the second lens unit L2 and displacement of the image point during zooming is compensated for by the movement of the first lens unit L1.

Characteristics of the embodiments of the present invention having the above-described structures will now be described.

The zoom lens systems include the first lens unit L1 having a negative refractive power and the second lens unit L2 having a positive refractive power in order from the object side to the image side. During zooming, the distance between the first lens unit L1 and the second lens unit L2 is reduced. The first lens unit L1 includes the single negative lens G11 and the single positive lens G12. In this structure, when $v1p$ is an Abbe number of a material of the positive lens G12, f1 is a focal length of the first lens unit L1, fw is a focal length of the entire system at the wide angle end, the following conditions are satisfied:

$$v1p < 18.5 \quad (1)$$

$$2.0 < |f1|/fw < 2.8 \quad (2)$$

Expression (1) defines the range of the Abbe number of the material of the positive lens G12 included in the first lens unit L1. If the Abbe number is above the upper limit, that is, if the dispersion is too small, the refractive power of each of the lenses included in the first lens unit L1 must be increased to correct chromatic aberrations. In such a case, the field curvature and distortion are increased in the wide-angle range and the spherical aberration and coma aberration are increased in the telephoto range.

Expression (2) defines the range of the focal length of the first lens unit L1. If the focal length is reduced such that the value of Expression (2) is below the lower limit thereof, that is, if the refractive power is too high, the negative lens included in the first lens unit L1 causes large amounts of field curvature and distortion in the wide-angle range and causes large amounts of spherical aberration and coma aberration in the telephoto range. Therefore, it becomes difficult to correct the above-mentioned aberrations using the two lenses included in the first lens unit L1.

Although the aberrations can be corrected by increasing the number of lenses, the size of the first lens unit L1 will be increased in such a case.

If the focal length is increased such that the value of Expression (2) is above the upper limit thereof, that is, if the refractive power is too low, the refractive power distribution of the retrofocus type is degraded and it becomes difficult to ensure the back focus.

If Expressions (1) and (2) are simultaneously satisfied, a small negative-lead zoom lens capable of adequately correcting the aberrations over the entire zooming range and having a long back focus can be obtained.

In the zoom lens systems, when $N1n$ and $v1n$ are a refractive index and an Abbe number, respectively, of a material of the negative lens G11, the following conditions can be satisfied:

$$1.83 < N1n \quad (4)$$

$$27 < \nu 1n \quad (5)$$

Expression (4) defines the range of the refractive index of the material of the negative lens G11 included in the first lens unit L1. If the refractive index is below the lower limit, the thickness of the negative lens designed to have a desired refractive power is increased at the periphery thereof. In the case in which the negative lens is, for example, a glass-mold aspheric lens, the lens thickness at the center must be somewhat increased in accordance with the lens thickness at the periphery. Otherwise, there is a risk that fusion will occur in the process of removing the lens from the mold. Therefore, if the thickness of the lens at the periphery thereof is increased, it is also necessary to increase the thickness at the center. Thus, it is difficult to reduce the size of the lens. In addition, the curvature of the lens surface is too large, and therefore the field curvature and the distortion cannot be sufficiently corrected in the wide-angle range due to the aspherical shape of the lens.

Expression (5) defines the range of the Abbe number of the material of the negative lens included in the first lens unit L1. If the Abbe number is below the lower limit, that is, if the dispersion is too large, the lateral chromatic aberration is increased in the wide-angle range and the longitudinal chromatic aberration is increased in the telephoto range.

If Expressions (4) and (5) are simultaneously satisfied in addition to Expressions (1) and (2), a small zoom lens system capable of adequately correcting the aberrations over the entire zooming range even when the zoom ratio is increased can be obtained.

Conditions that can be satisfied to solve various technical problems of zoom lenses will now be described. If one or more of the following conditions is satisfied, additional advantages corresponding to the conditions can be obtained.

First, when N1p is the refractive index of the material of the positive lens included in the first lens unit L1, the following condition can be satisfied:

$$1.93 < N1p \quad (3)$$

Expression (3) defines the range of the refractive index of the material of the positive lens G12 included in the first lens unit L1. If the positive lens G12 is formed of a material that satisfies Expression (3), the thickness of the positive lens G12 can be reduced while maintaining the desired refractive power. If the refractive index is below the lower limit of Expression (3), the thickness of the positive lens designed to have a desired refractive power is increased at the center thereof. Therefore, the size cannot be reduced.

In addition, when f1p is a focal length of the positive lens included in the first lens unit L1, the following condition can be satisfied:

$$0.9 < f1p/|f1| < 2.2 \quad (6)$$

Expression (6) defines the range of the focal length of the positive lens G11 included in the first lens unit L1. If the focal length of the positive lens G11 in the first lens unit L1 is set so as to satisfy Expression (6), the aberrations can be suppressed and adequately corrected. If the focal length is reduced such that the value of Expression (6) is below the lower limit thereof, the spherical aberration is increased in the telephoto range. If the focal length is increased such that the value of Expression (6) is above the upper limit thereof, the lateral chromatic aberration cannot be sufficiently corrected over the entire zooming range and the longitudinal chromatic aberration cannot be sufficiently corrected in the telephoto range.

When f2 is a focal length of the second lens unit L2, the following condition can be satisfied:

$$1.3 < f2/fw < 2.4 \quad (7)$$

Expression (7) defines the range of the focal length of the second lens unit L2. If the focal length of the second lens unit L2 is adequately set so as to satisfy Expression (7), the aberrations can be adequately corrected without increasing the overall length of the lens. If the focal length is reduced such that the value of Expression (7) is below the lower limit thereof, the Petzval sum becomes too large and the field curvature cannot be sufficiently corrected. If the focal length is increased such that the value of Expression (7) is above the upper limit thereof, the amount of movement of the second lens unit L2 for zooming is increased and the overall length of the lens is increased in the telephoto range.

When L0 is a distance between a vertex of a lens surface nearest to the object side in the first lens unit L1 (the object-side surface of the negative lens G11) and a vertex of a lens surface nearest to the image side in the first lens unit L1 (the image-side surface of the positive lens G12), the following condition can be satisfied:

$$0.6 < L0/fw < 1.3 \quad (8)$$

Expression (8) defines the range of the thickness of the first lens unit L1 along an optical axis. If the thickness of the first lens unit L1 is adequately set so as to satisfy Expression (8), the zoom ratio can be increased without increasing the diameter of the front lens in the first lens unit L1. If the first lens unit L1 is too thin and the value of Expression (8) is below the lower limit thereof, the distance between the negative lens and the positive lens included in the first lens unit L1 is too small. Therefore, the optical effects obtained by the first lens unit L1 of the retrofocus type including the negative lens and the positive lens arranged in that order from the object side are reduced.

Because the first lens unit L1 is of the retrofocus type, a rear principal point can be positioned relatively near the image side and the distance between the first lens unit L1 and the second lens unit L2 can be easily ensured at the telephoto end.

If the value of Expression (8) is below the lower limit thereof, it becomes difficult to set the rear principal point of the first lens unit L1 sufficiently near the image side. Accordingly, the first lens unit L1 and the second lens unit L2 easily interfere with each other in the telephoto range. The interference cannot be avoided without reducing the zoom ratio. If the first lens unit L1 is too thick and the value of Expression (8) is above the upper limit thereof, the diameter of the front lens is increased.

When m2 is the amount of movement (absolute value) of the second lens unit L2 from the wide-angle end to the telephoto end along the optical axis, the following condition can be satisfied:

$$1.90 < m2/fw < 3.2 \quad (9)$$

Expression (9) defines the range of the amount of movement of the second lens unit L2 during zooming. If the amount of movement of the second lens unit L2 is adequately set so as to satisfy Expression (9), the requirements regarding the zoom ratio, the size, and the optical performance are satisfied in good balance. If the amount of movement is too small and the value of Expression (9) is below the lower limit thereof, the refractive power of the second lens unit L2 must be increased to achieve high zoom ratio.

In such a case, the Petzval sum becomes too large and the field curvature cannot be sufficiently corrected. If the amount of movement is too large and the value of Expression (9) is above the upper limit thereof, the overall length at the telephoto end is too long and the size cannot be sufficiently reduced. In addition, since the distance between the aperture stop and the image plane is increased at the telephoto end, the F-number is increased.

In the case in which the third lens unit L3 is included as in the first to third embodiments, when f3 is the focal length of the third lens unit L3, the following condition can be satisfied:

$$4.0 < f3/fw < 7.0 \tag{10}$$

Expression (10) defines the range of the focal length of the third lens unit L3 in the case in which the third lens unit L3 is provided at the image side of the second lens unit L2. If the focal length of the third lens unit L3 is adequately set so as to satisfy Expression (10), the entire system is set to have desired telecentricity and the aberrations can be adequately corrected.

If the focal length is too small and the value of Expression (10) is below the lower limit thereof, the lateral chromatic aberration is increased. If the focal length is too large and the value of Expression (10) is above the upper limit thereof, the optical effect as a field lens cannot be sufficiently obtained and it becomes difficult to place the exit pupil away from the image plane. As a result, in the case in which the solid-state image pickup element is used, the amount of light is reduced in the peripheral region.

In each of the above-described embodiments, the numerical ranges of Expression (1) to (10) can also be set as follows:

$$v1p < 18.2 \tag{1a}$$

$$2.1 < f1/fw < 2.7 \tag{2a}$$

$$1.940 < N1p \tag{3a}$$

$$1.840 < N1n \tag{4a}$$

$$28 < v1n \tag{5a}$$

$$1.0 < f1p/|f1| < 2.1 \tag{6a}$$

$$1.5 < f2/fw < 2.2 \tag{7a}$$

$$0.70 < L0/fw < 1.20 \tag{8a}$$

$$2.10 < m2/fw < 3.10 \tag{9a}$$

$$4.3 < f3/fw < 6.5 \tag{10a}$$

A zoom lens system according to another aspect of the present invention satisfies Expression (6a) in addition to Expressions (1) and (2). In this case, a small zoom lens system capable of adequately correcting the aberrations over the entire zooming range, in particular the telephoto range, even when the zoom ratio is increased can be obtained.

According to another aspect of the present invention, a zoom lens system includes the third lens unit L3 and satisfies Expression (1) and (2), and a lens surface nearest to the object side in the third lens unit L3 (the object-side surface of the lens G31) is convex toward the object side.

Thus, according to the embodiments of the present invention in which the lens units are structured as described above, a zoom lens with a high optical performance having a high zoom ratio (for example, 3.5 or more) and a large field angle (for example, 50° or more) can be obtained.

The structures of the lens units according to the first to third embodiments will now be described.

The first lens unit L1 includes the negative lens G11 and the positive lens G12 in order from the object side to the image side. The negative lens G11 has a concave surface on the image side. The positive lens G12 has a meniscus shape with a convex surface on the object side. Thus, the size of the entire lens system is reduced by reducing the number of lenses and the aberrations are adequately corrected.

The first lens unit L1 includes at least one aspherical surface. Therefore, the distortion and the field curvature can be adequately corrected in the wide-angle range and the spherical aberration and the like can be adequately corrected in the telephoto range.

In the first embodiment shown in FIG. 1, surfaces on both sides of the negative lens G11 are aspherical. In the second and third embodiments shown in FIGS. 5 and 9, the image-side surface of the negative lens G11 is aspherical. The image-side surface of the negative lens G11 is shaped such that the curvature is reduced toward the periphery thereof, and accordingly the aberrations are corrected.

The positive lens G12 of the first lens unit L1 is formed of an ultra-high dispersion that satisfies Expression (1). The overall size of the system can be effectively reduced by increasing the refractive powers of the lens units L1 and L2. When the refractive power of the first lens unit L1 is increased, the refractive powers of the negative lens G11 and the positive lens G12 tend to be increased to achieve achromatizing in the first lens unit L1.

Accordingly, in the embodiments, the positive lens G12 is formed of a high-dispersion material with an extremely small Abbe number (18.5 or less) so as to increase the difference in Abbe number between the positive lens G12 and the negative lens G11. Thus, the refractive powers of the negative lens G11 and the positive lens G12 are made as small as possible.

Accordingly, the field curvature and the distortion generated by the first lens unit L1 in the wide-angle range are reduced, and a small lens system with a high performance is obtained.

In each embodiment, both the negative lens G11 and the positive lens G12 of the first lens unit L1 are made of a high-refractive-index material that satisfies Expressions (3) and (4). Since the high-refractive-index material is used, the lens thickness can be reduced while obtaining the desired refractive power. In addition, correction of high-order spherical aberration in the telephoto range is facilitated.

In addition, the positive lens G12 is made of a material with relatively high partial dispersion ratio. Accordingly, the second-order spectrum is reduced in the telephoto range.

The second lens unit includes one or more cemented lenses including a positive lens and a negative lens and having a positive refractive power. More specifically, the second lens unit L2 includes the positive cemented lens G25 having the positive lens G21 and the negative lens G22 and the positive cemented lens G26 having the negative lens G23 and the positive lens G24 in order from the object side to the image side.

The second lens unit L2 easily causes aberration variations during zooming. Therefore, the second lens unit L2 is designed to have a relatively symmetrical lens structure to reduce the aberration variations during zooming. The magnification of the second lens unit L2 is 1 at the middle zoom position. The second lens unit L2 has a structure developed from a triplet structure and includes a positive lens, a negative lens, a negative lens, and as positive lens. The second lens unit L2 adequately corrects the aberrations and reduces the aberration variations during zooming. In particular, the above-described structure of the second lens unit L2 is advantageous in reducing the aberrations in the case in which the zoom ratio is increased.

The positive lens G21 nearest to the object side in the second lens unit L2 has a convex surface on the object side.

Accordingly, the principal ray emitted from the first lens unit L1 is prevented from being largely refracted, whereby the axial chromatic aberration is suppressed.

In addition, since the positive lens G21 has a convex surface on the object side, the spherical aberration with respect to on-axis rays emitted from the first lens unit L1 in a divergent state can be suppressed. The surface of the positive lens G21 on the object side can be aspherical. In such a case, the spherical aberration can be adequately corrected in the case in which the lens diameter is increased.

The negative lens G22 has a concave surface on the image side. Therefore, the coma aberration generated at the object-side surface of the positive lens G21 is corrected by the image-side surface of the negative lens G22.

Both the spherical aberration and the coma aberration are adequately corrected by designing the positive lens G21 and the negative lens G22 to have the above-described shapes.

The cemented lens G25 including the positive lens G21 and the negative lens G22 has a meniscus shape as a whole. Therefore, the refractive power cannot be largely increased. Accordingly, in the embodiments, the positive refractive power of the second lens unit L2 is mainly obtained by the cemented lens G26 on the image side.

According to the above-described structure, the aberrations caused by the second lens unit L2 in accordance with the increase in zoom ratio are reduced in the entire zooming range and the thickness of the lens structure can be reduced.

It is not necessary that the positive lens G21 and the negative lens G22 form a cemented lens. The positive lens G21 and the negative lens G22 can also be spaced from each other as long as the spherical aberration and the coma aberration can be adequately corrected. Alternatively, the positive lens G21 and the negative lens G22 can be replaced by a single meniscus lens having a convex surface on the object side. In such a case, the chromatic aberration is corrected by the cemented lens G26.

The third lens unit L3 has a positive refractive power. The third lens unit L3 functions as a field lens so as to achieve telecentric imaging on the image side required in an image pickup apparatus including a solid-state image pickup device.

The third lens unit L3 is moved toward the image size during zooming from the wide-angle end to the telephoto end. However, in each of the embodiments, the third lens unit L3 can also be stationary during zooming. In such a case, mechanical components, such as an actuator, for moving the third lens unit L3 can be omitted.

In the case in which the third lens unit L3 is moved during zooming, it is not advantageous to move the third lens unit L3 largely toward the object side during zooming from the wide-angle end to the telephoto end. If the third lens unit L3 is moved toward the object side, the magnification of the third lens unit L3 is reduced and the zoom ratio of the entire system will be reduced.

Therefore, to increase the zoom ratio, the second lens unit L2 and the third lens unit L3 can be driven such that the distance therebetween is increased during zooming from the wide-angle end to the telephoto end. In addition, the third lens unit L3 can be moved toward the image side during zooming from the wide-angle end to the telephoto end. In such a case, the zooming effect can be improved.

In addition, in the zoom lens of each embodiment, focusing can be performed with the third lens unit L3 that has a small number of lenses. In such a case, the size of the focusing lens unit is reduced.

In each embodiment, all of the three lens units are moved during zooming. However, the present invention can also be applied to a system in which two of the lens units (for example, the first and second lens units, the first and third lens units, or the second and third lens units) are moved so as to change the distances between the lens units.

Next, the fourth embodiment shown in FIG. 13 will be described. In the fourth embodiment, structures of the first lens unit L1 and the second lens unit L2 are similar to those in the first to third embodiments shown in FIGS. 1, 5, and 9. A retractable lens system in which distances between lens units are reduced when the lens system is not used for photographing is known. In the fourth embodiment, the overall length of the system in the retracted state can be reduced since the third lens unit is not included. Thus, the structure of the fourth embodiment is advantageous in view of reduction in the size of the image pickup apparatus.

Focusing is performed by the first lens unit L1.

The zoom lens systems according to the first to third embodiments are the three-unit zoom lenses including a lens unit having a negative refractive power, a lens unit having a positive refractive power, and a lens unit having a positive refractive power in order from the object side to the image side. The zoom lens system according to the fourth embodiment is a two-unit zoom lens including a lens unit having a negative refractive power and a lens unit having a positive refractive power in order from the object side to the image side. However, the present invention is not limited to the zoom lens systems according to the above-described embodiments. For example, effects similar to those of the above-described embodiments can also be obtained by a structure in which a lens unit having a small refractive power is additionally provided at the object side of the first lens unit L1 or a structure in which a lens unit having a small refractive power is additionally provided at the image side of the third lens unit L3 in the first to third embodiments or at the image side of the second lens unit in the fourth embodiment.

In addition, the present invention can also be applied to a four-unit zoom lens including a lens unit having a negative refractive power, a lens unit having a positive refractive power, a lens having a positive refractive power, and a lens unit having a positive refractive power obtained by dividing the second lens unit L2 of the first to third embodiments into two lens units having a positive refractive power. Alternatively, the present invention can also be applied to a four-unit zoom lens including a lens unit having a negative refractive power, a lens unit having a positive refractive power, a lens having a negative refractive power, and a lens unit having a positive refractive power obtained by dividing the second lens unit L2 into a lens having a negative refractive power and a lens unit having a positive refractive power. In addition, the present invention can also be applied to systems including more than four lens units.

Similarly, the present invention can also be applied to a three-unit zoom lens including a lens unit having a negative refractive power, a lens having a positive refractive power, and a lens unit having a positive refractive power obtained by dividing the second lens unit L2 of the fourth embodiment into two lens units having a positive refractive power. Alternatively, the present invention can also be applied to a three-unit zoom lens including a lens unit having a negative refractive power, a lens having a positive refractive power, and a lens unit having a negative refractive power obtained by dividing the second lens unit L2 of the fourth embodiment into a lens unit having a positive refractive power and a lens unit having a negative refractive power.

Numerical data (numerical examples) corresponding to the first to fourth embodiments will be described next. In each numerical example, i indicates the surface number counted from the object side and Ri indicates the radius of curvature of the $i^{th}$ lens surface counted from the object side. Di indicates the lens thickness and air gap between the $i^{th}$ lens surface and the $(i+1)^{th}$ lens surface. Ni and vi indicate the refractive index and the Abbe number, respectively, with respect to the d line. The two surfaces nearest to the image side form the optical block G. In addition, f is the focal length, Fno is the F-number, and ω is the half angle of view.

When X is the position of the aspherical surface in the optical axis direction with respect to the vertex of the aspherical surface at a height H from the optical axis, the aspherical shape is expressed as follows:

$$X = \frac{(1/R)H^2}{1+\sqrt{1-(1+K)(H/R)^2}} + BH^4 + CH^6 + DH^8 + EH^{10} + FH^{12}$$

where R is the paraxial radius of curvature, K is the conic constant, and B, C, D, E, and F are the aspherical coefficients.

In the values of the conic constant and the aspherical coefficients, "e-0X" indicates "×10$^{-x}$". Table 1 provided below shows the values of the above-described conditional expressions in each numerical example.

The values of D5 in the first to fourth numerical examples are negative because the F-number determining member SP and the lens G21 of the second lens unit L2 are counted in order from the object side. More specifically, referring to FIGS. 1, 5, 9, and 13, the F-number determining member SP is nearer to the image side than the vertex of the object-side surface of the lens G21 of the second lens unit L2 by a distance corresponding to the absolute values of D5.

Numerical Example 1
f = 4.73 to 16.95  Fno = 2.89 to 5.70  2ω = 70.6° to 22.4°

| R1 = 29.729 | D1 = 1.35 | N1 = 1.848620 | v1 = 40.4 |
|---|---|---|---|
| R2 = 4.887 | D2 = 2.69 | | |
| R3 = 8.790 | D3 = 1.50 | N2 = 1.945950 | v2 = 18.0 |
| R4 = 13.740 | D4 = variable | | |
| R5 = aperture stop | D5 = −0.49 | | |
| R6 = 4.196 | D6 = 1.90 | N3 = 1.783423 | v3 = 45.9 |
| R7 = 6.215 | D7 = 0.60 | N4 = 1.698947 | v4 = 30.1 |
| R8 = 3.678 | D8 = 0.51 | | |
| R9 = 7.918 | D9 = 0.50 | N5 = 1.846660 | v5 = 23.9 |
| R10 = 4.043 | D10 = 2.15 | N6 = 1.638539 | v6 = 55.4 |
| R11 = −15.225 | D11 = variable | | |
| R12 = 14.878 | D12 = 1.35 | N7 = 1.622992 | v7 = 58.2 |
| R13 = 89.039 | D13 = variable | | |
| R14 = ∞ | D14 = 0.80 | N8 = 1.516330 | v8 = 64.1 |
| R15 = ∞ | | | |

| | Focal Length | | |
|---|---|---|---|
| Variable Distance | 4.73 | 10.75 | 16.95 |
| D4 | 14.27 | 3.77 | 0.83 |
| D11 | 3.77 | 10.78 | |

Aspherical Coefficients

| R1 | k = −7.50224e+00 | B = 9.18146e−05 | C = 2.40557e−06 | D = −6.69411e−08 |
|---|---|---|---|---|
| | E = 4.62065e−10 | F = 0 | | |
| R2 | k = −2.03956e 00 | B = 1.63749e−03 | C = −1.08551e−05 | D = 5.79941e−07 |
| | E = −1.14835e−08 | F = 0 | | |
| R6 | k = −3.33536e−01 | B = −7.17021e−05 | C = 4.42696e−06 | D = 0.00000e+00 |
| | E = −3.50000e−08 | F = 1.90000e−9 | | |

Numerical Example 2
f = 5.93 to 22.82  Fno = 2.82 to 5.67  2ω = 58.9° to 16.7°°

| R1 = 52.791 | D1 = 1.45 | N1 = 1.903660 | v1 = 31.3 |
|---|---|---|---|
| R2 = 5.820 | D2 = 1.80 | | |
| R3 = 10.001 | D3 = 1.95 | N2 = 1.945950 | v2 = 18.0 |
| R4 = 25.178 | D4 = variable | | |
| R5 = aperture stop | D5 = −0.50 | | |
| R6 = 4.645 | D6 = 1.94 | N3 = 1.859610 | v3 = 40.3 |
| R7 = 14.399 | D7 = 0.50 | N4 = 1.728250 | v4 = 28.5 |
| R8 = 3.929 | D8 = 0.83 | | |
| R9 = 10.581 | D9 = 0.50 | N5 = 2.003300 | v5 = 28.3 |
| R10 = 5.243 | D10 = 1.80 | N6 = 1.772499 | v6 = 49.6 |
| R11 = −35.672 | D11 = variable | | |
| R12 = 14.244 | D12 = 1.50 | N7 = 1.487490 | v7 = 70.2 |
| R13 = 1505.401 | D13 = variable | | |

-continued

| | | | |
|---|---|---|---|
| R14 = ∞ | D14 = 1.28 | N8 = 1.516330 | ν8 = 64.1 |
| R15 = ∞ | | | |

| | Focal Length | | |
|---|---|---|---|
| Variable Distance | 5.93 | 14.36 | 22.82 |
| D4 | 20.78 | 5.69 | 1.75 |
| D11 | 7.51 | 16.17 | 24.82 |
| D13 | 2.58 | 2.53 | 2.48 |

Aspherical Coefficients

| | | | | |
|---|---|---|---|---|
| R2 | k = −2.01603e+00 | B = 8.90768e−04 | C = −8.23640e−06 | D = 1.16620e−07 |
| | E = −9.45604e−10 | F = 0 | | |
| R6 | k = −4.32757e−01 | B = 1.96970e−04 | C = 5.68850e−06 | D = 3.97996e−07 |
| | E = 0.00000e+00 | F = 0 | | |

Numerical Example 3
f = 5.95 to 22.74 Fno = 2.88 to 5.90 2ω = 58.7° to 16.8°

| | | | |
|---|---|---|---|
| R1 = 29.321 | D1 = 1.20 | N1 = 2.100000 | ν1 = 30.0 |
| R2 = 6.014 | D2 = 1.80 | | |
| R3 = 9.822 | D3 = 1.50 | N2 = 2.000000 | ν2 = 16.0 |
| R4 = 21.412 | D4 = variable | | |
| R5 = aperture stop | D5 = −0.50 | | |
| R6 = 4.660 | D6 = 1.94 | N3 = 1.859610 | ν3 = 40.3 |
| R7 = 26.057 | D7 = 0.50 | N4 = 1.728250 | ν4 = 28.5 |
| R8 = 3.942 | D8 = 0.83 | | |
| R9 = 10.588 | D9 = 0.50 | N5 = 2.003300 | ν5 = 28.3 |
| R10 = 5.404 | D10 = 1.80 | N6 = 1.772499 | ν6 = 49.6 |
| R11 = −30.488 | D11 = variable | | |
| R12 = 11.996 | D12 = 1.50 | N7 = 1.487490 | ν7 = 70.2 |
| R13 = 38.598 | D13 = variable | | |
| R14 = ∞ | D14 = 1.28 | N8 = 1.516330 | ν8 = 64.1 |
| R15 = ∞ | | | |

| | Focal Length | | |
|---|---|---|---|
| Variable Distance | 5.95 | 14.33 | 22.74 |
| D4 | 18.57 | 5.38 | 1.92 |
| D11 | 7.80 | 16.49 | 25.18 |
| D13 | 2.11 | 2.06 | 2.01 |

Aspherical Coefficients

| | | | | |
|---|---|---|---|---|
| R2 | k = −2.11820e+00 | B = 9.21555e−04 | C = −6.72439e−06 | D = 9.27180e−08 |
| | E = −6.77223e−10 | F = 0 | | |
| R6 | k = −4.25654e−01 | B = 1.56052e−04 | C = 5.06920e−06 | D = 3.32698e−07 |
| | E = 0.00000e+00 | F = 0 | | |

Numerical Example 4
f = 6.90 to 26.20 Fno = 3.50 to 7.00 2ω = 51.8° to 14.6°

| | | | |
|---|---|---|---|
| R1 = 52.982 | D1 = 1.45 | N1 = 1.900000 | ν1 = 29.0 |
| R2 = 6.061 | D2 = 1.80 | | |
| R3 = 9.542 | D3 = 1.95 | N2 = 1.945950 | ν2 = 18.0 |
| R4 = 20.252 | D4 = variable | | |
| R5 = aperture stop | D5 = −0.50 | | |
| R6 = 4.496 | D6 = 1.94 | N3 = 1.859610 | ν3 = 40.3 |
| R7 = 6.419 | D7 = 0.50 | N4 = 1.740769 | ν4 = 27.8 |
| R8 = 4.023 | D8 = 0.83 | | |

-continued

| R9 = 10.397 | D9 = 0.50 | N5 = 2.003300 | ν5 = 28.3 |
| R10 = 4.320 | D10 = 2.20 | N6 = 1.772499 | ν6 = 49.6 |
| R11 = −22.013 | D11 = variable | | |
| R12 = ∞ | D12 = 1.28 | N7 = 1.516330 | ν7 = 64.1 |
| R13 = ∞ | | | |

| | Focal Length | | |
|---|---|---|---|
| Variable Distance | 6.90 | 16.55 | 26.20 |
| D4 | 19.25 | 4.41 | 0.50 |
| D11 | 10.70 | 18.09 | 25.48 |

Aspherical Coefficients

| R2 | k = −2.27325e+00 | B = 1.00101e−03 | C = −7.11483e−06 | |
| | D = −9.98470e−08 | E = 5.82150e−09 | F = 0 | |
| R6 | k = −4.53317e−01 | B = 1.97087e−04 | C = 5.91654e−06 | D = 3.57396e−07 |
| | E = 0.00000e+00 | F = 0 | | |

TABLE 1

| Conditional Expression | 1st Example | 2nd Example | 3rd Example | 4th Example |
|---|---|---|---|---|
| (1) | 18.0 | 18.0 | 16.0 | 18.0 |
| (2) | 2.39 | 2.53 | 2.27 | 2.19 |
| (3) | 1.94595 | 1.94595 | 2.00000 | 1.94595 |
| (4) | 184862 | 1.90366 | 2.10000 | 1.90000 |
| (5) | 40.4 | 31.3 | 30.0 | 29.0 |
| (6) | 1.99 | 1.10 | 1.26 | 1.16 |
| (7) | 2.13 | 2.11 | 1.98 | 1.68 |
| (8) | 1.17 | 0.88 | 0.76 | 0.75 |
| (9) | 2.89 | 2.90 | 2.90 | 2.14 |
| (10) | 6.02 | 4.97 | 5.89 | — |

Next, a digital still camera (image pickup apparatus) including the zoom lens system according to an exemplary embodiment as an imaging optical system will be described below with reference to FIG. 17.

With reference to FIG. 17, the digital still camera includes a camera body 20, an imaging optical system 21 including the zoom lens system according to an exemplary embodiment of the present invention, and a solid-state image pickup device (photoelectric converter) 22 such as a CCD sensor and a CMOS sensor that is mounted in the camera body 20 and that receives an object image formed by the imaging optical system 21.

In addition, the digital still camera further includes a memory 23 that records information corresponding to the object image obtained as a result of photoelectric conversion performed by the image-pickup device 22, and a finder 24 including a liquid crystal display panel or other display and can be used to observe the object image formed on the solid-state image pickup device 22.

Accordingly, when a zoom lens system according to an exemplary embodiment is applied to an image pickup apparatus, such as a digital still camera, a small image pickup apparatus having good optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-000541 filed Jan. 5, 2007 which is hereby incorporated by reference herein in its entirety.

What is claimed is:

1. A zoom lens system comprising:
a first lens unit having a negative optical power, the first lens unit including a single negative lens element and a single positive lens element; and
a second lens unit having a positive optical power,
wherein the first lens unit and the second lens unit are arranged in that order from an object side to an image side,
wherein a distance between the first lens unit and the second lens unit at a telephoto end is smaller than that at a wide angle end, and
wherein, when ν1p is an Abbe number of a material of the positive lens element, f1 is a focal length of the first lens unit, fw is a focal length of the entire zoom lens system at the wide angle end, and N1n and ν1n are a refractive index and an Abbe number, respectively, of the material of the negative lens element, the following conditions are satisfied:

$\nu 1p < 18.5$ $2.0 < |f1|/fw < 2.8$ $1.83 < N1n$, and $27 < \nu 1n$.

2. The zoom lens system according to claim 1, wherein, when N1p is a refractive index of the material of the positive lens element, the following condition is satisfied:

$1.93 < N1p$.

3. The zoom lens system according to claim 1, wherein, when f1p is a focal length of the positive lens element, the following condition is satisfied:

$0.9 < f1p/|f1| < 2.2$.

4. The zoom lens system according to claim 1, wherein, when f2 is a focal length of the second lens unit, the following condition is satisfied:

$1.3 < f2/fw < 2.4$.

5. The zoom lens system according to claim 1, wherein, when L0 is a distance between a vertex of a lens surface nearest to the object side in the first lens unit and a vertex of a lens surface nearest to the image side in the first lens unit, the following condition is satisfied:

$$0.6 < L0/fw < 1.3.$$

6. The zoom lens system according to claim 1, wherein, when m2 is an amount of movement of the second lens unit from the wide angle end to the telephoto end along an optical axis, the following condition is satisfied:

$$1.90 < m2/fw < 3.2.$$

7. The zoom lens system according to claim 1, further comprising:
   a third lens unit disposed at the image side of the second lens unit and having a positive optical power,
   wherein, when f3 is a focal length of the third lens unit, the following condition is satisfied:

$$4.0 < f3/fw < 7.0.$$

8. A zoom lens system comprising:
   a first lens unit having a negative optical power, the first lens unit including a single negative lens element and a single positive lens element; and
   a second lens unit having a positive optical power,
   wherein the first lens unit and the second lens unit are arranged in that order from an object side to an image side,
   wherein a distance between the first lens unit and the second lens unit at a telephoto end is smaller than that at a wide angle end, and
   wherein, when $v1p$ is an Abbe number of a material of the positive lens element, f1 is a focal length of the first lens unit, fw is a focal length of the entire zoom lens system at the wide angle end, and $f1p$ is a focal length of the positive lens element, the following conditions are satisfied:

$$v1p < 18.5$$

$$2.0 < |f1|/fw < 2.8, \text{ and}$$

$$1.0 < f1p/|f1| < 2.1.$$

9. A zoom lens system comprising:
   a first lens unit having a negative optical power, the first lens unit including a single negative lens element and a single positive lens element; and
   a second lens unit having a positive optical power; and
   a third lens unit having a positive optical power, a lens surface nearest to the object side in the third lens unit being convex toward the object side,
   wherein the first lens unit, the second lens unit, and the third lens unit are arranged in that order from an object side to an image side,
   wherein a distance between the first lens unit and the second lens unit at a telephoto end is smaller than that at a wide angle end and a distance between the second lens unit and the third lens unit at the telephoto end is larger than that at the wide angle end, and
   wherein when $v1p$ is an Abbe number of a material of the positive lens element, f1 is a focal length of the first lens unit, and fw is a focal length of the entire zoom lens system at the wide angle end, the following conditions are satisfied:

$$v1p < 18.5, \text{ and}$$

$$2.0 < |f1|/fw < 2.8.$$

* * * * *